(12) United States Patent
Das et al.

(10) Patent No.: US 9,198,004 B2
(45) Date of Patent: Nov. 24, 2015

(54) USER-IN-THE-LOOP ARCHITECTURE FOR INDOOR POSITIONING

(71) Applicant: QUALCOMM Incorporated, San Diego, CA (US)

(72) Inventors: Saumitra Mohan Das, Santa Clara, CA (US); Faraz Mohammad Mirzaei, San Jose, CA (US); Vinay Sridhara, Santa Clara, CA (US)

(73) Assignee: QUALCOMM Incorporated, San Diego, CA (US)

( * ) Notice: Subject to any disclaimer, the term of this patent is extended or adjusted under 35 U.S.C. 154(b) by 132 days.

(21) Appl. No.: 13/778,486

(22) Filed: Feb. 27, 2013

(65) Prior Publication Data

US 2014/0243017 A1  Aug. 28, 2014

(51) Int. Cl.
*H04W 4/04* (2009.01)
*G01C 21/20* (2006.01)

(52) U.S. Cl.
CPC ............ *H04W 4/043* (2013.01); *G01C 21/206* (2013.01)

(58) Field of Classification Search
CPC .............................. G01C 21/206; H04W 4/043
USPC .................................................... 455/456.2
See application file for complete search history.

(56) References Cited

U.S. PATENT DOCUMENTS

| | | | |
|---|---|---|---|
| 6,266,615 B1 | 7/2001 | Jin | |
| 6,654,683 B2 | 11/2003 | Jin et al. | |
| 8,213,389 B2 | 7/2012 | Bush et al. | |
| 2011/0137549 A1 | 6/2011 | Gupta et al. | |
| 2011/0161855 A1* | 6/2011 | Prehofer | ........................ 715/771 |
| 2011/0276266 A1 | 11/2011 | Ballew et al. | |
| 2012/0072110 A1* | 3/2012 | Venkatraman | ................ 701/434 |

FOREIGN PATENT DOCUMENTS

| | | |
|---|---|---|
| CN | 102338866 A | 2/2012 |
| TW | 201020522 A | 6/2010 |
| TW | 201226014 A | 7/2012 |
| TW | 201244254 A | 11/2012 |

OTHER PUBLICATIONS

Written Opinion of the International Preliminary Examining Authority—PCT/US2014/011955—IPEA/EPO—Aug. 29, 2014.

(Continued)

*Primary Examiner* — Qun Shen
(74) *Attorney, Agent, or Firm* — Hunter Clark PLLC

(57) ABSTRACT

Techniques for determining a position of a mobile device in an indoor environment are provided. An example method includes receiving a request for the position of the mobile device within the indoor environment from an application running on the mobile device, estimating the position of the mobile device within the indoor environment based on signals received from a plurality of wireless access points responsive to receiving the request for the position of the mobile device, identifying an ambiguity in estimating the position of the mobile device, identifying disambiguation information for resolving the ambiguity in the position, requesting disambiguation information for resolving the ambiguity associated with the position, receiving the disambiguation information for resolving the ambiguity associated with the position; resolving the ambiguity in estimating the position using the disambiguation information; and determining the position of the mobile device in the indoor environment.

53 Claims, 10 Drawing Sheets

(56) References Cited

OTHER PUBLICATIONS

International Search Report and Written Opinion—PCT/US2014/011955—ISA/EPO—May 22, 2014.

Taiwan Search Report—TW103104123—TIPO—Mar. 17, 2015—1 pg.
International Preliminary Report on Patentability—PCT/US2014/011955, European Patent Office (EPO)—Rijswijk—Pays Bas, Netherlands, Dec. 4, 2014, 32 pgs.

* cited by examiner

Mobile Device

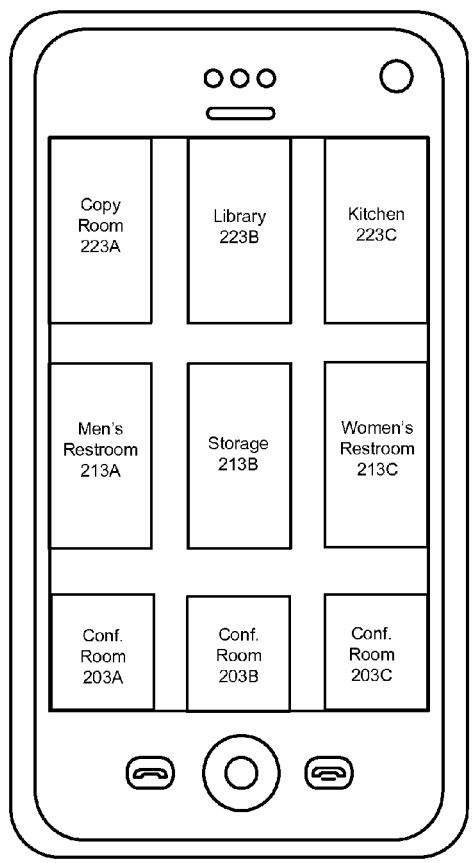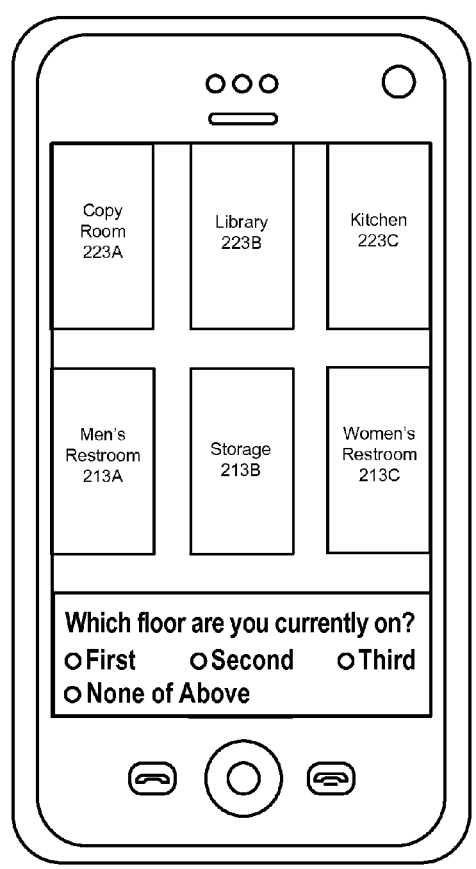
*FIG. 11A*   *FIG. 11B*

USER-IN-THE-LOOP ARCHITECTURE FOR INDOOR POSITIONING

BACKGROUND

1. Field of the Invention

The present disclosure relates generally to indoor positioning techniques, and more specifically to techniques for providing improved position determination.

2. Related Art

When performing positioning in an indoor environment, disambiguating between different regions of the indoor environment is useful, if not critical. Indoor regions (also referred to herein as location areas) may be different floors of a building or portions of floors in a building or different portions of a floor. In this case, signals from wireless transceiver access points (APs) in different regions can be received by a single mobile device, which is also referred to herein as a mobile station (MS). Even though the mobile device is in a first region, the signal strength received from an AP in a second, different, region may be stronger than the signal strength of a signal received from an AP in the first region. This is especially true near portals such as staircases and elevator shafts, e.g., due to waveguide effects of these structures. Consequently, region disambiguation is performed to determine in which region the mobile device resides. Disambiguating between different indoor regions of a structure can be a time-consuming, highly power-consuming process. Furthermore, indoor regions can be defined relative to location context identifiers (LCIs). Each LCI can be associated with assistance data that the mobile device can use to help determine its position within the indoor environment. The amount of this assistance data can become quite large, depending on the size of the indoor region associated with the LCI. Accordingly, accurately determining which region in which the MS resides can become quite important, because the mobile device may have to download a significant amount of assistance data associated with the LCI in order to determine the position of the mobile device within the indoor environment.

SUMMARY

An example method for determining a position of a mobile device in an indoor environment according to the disclosure includes receiving a request for the position of the mobile device within the indoor environment from an application running on the mobile device; estimating the position of the mobile device within the indoor environment based on signals received from a plurality of wireless access points responsive to receiving the request for the position of the mobile device; identifying an ambiguity in estimating the position of the mobile device; identifying disambiguation information for resolving the ambiguity in the position of the mobile device; requesting disambiguation information for resolving the ambiguity associated with the position of the mobile device; receiving the disambiguation information for resolving the ambiguity associated with the position of the mobile device; resolving the ambiguity in estimating the position of the mobile device using the disambiguation information; and determining the position of the mobile device in the indoor environment.

Implementations of such a method may include one or more of the following features. Requesting the disambiguation information for resolving the ambiguity associated with the position of the mobile device includes displaying a multiple choice question on a display of the mobile device. Displaying the multiple choice question on the display of the mobile device includes resizing other running applications being displayed on the display of the mobile device to provide a portion of the display in which the multiple choice question can be displayed on the display of the mobile device. The indoor environment includes multiple floors; and the ambiguity in estimating the position of the mobile device is associated with determining which floor of the multiple floors of the indoor environment on which the mobile device is located. Requesting the disambiguation information for resolving the ambiguity associated with the position of the mobile device includes requesting information identifying a floor of the indoor environment on which the mobile device is located. Requesting disambiguation information for resolving the ambiguity associated with the position of the mobile device includes prompting for information identifying visible landmarks in the indoor environment located proximate to the mobile device. Resolving the ambiguity in estimating the position of the mobile device using the disambiguation information comprises selecting a position determination algorithm based at least in part on the disambiguation information. Determining the position of the mobile device in the indoor environment includes downloading a map of wireless access points from a server, the map of wireless access points being associated with a floor of the indoor environment on which the mobile device is estimated to be located. Requesting the disambiguation information for resolving the ambiguity associated with the position of the mobile device comprises sending a request for the disambiguation information to a remote server, and wherein receiving the disambiguation information includes receiving the disambiguation information from the remote server. The disambiguation information is received from a user of the mobile device, and the method includes transmitting at least a portion of the disambiguation information received from the user of the mobile device to a remote server.

An example of an apparatus for determining a position of a mobile device in an indoor environment according to the disclosure includes means for receiving a request for the position of the mobile device within the indoor environment from an application running on the mobile device; means for estimating the position of the mobile device within the indoor environment based on signals received from a plurality of wireless access points responsive to receiving the request for the position of the mobile device; means for identifying an ambiguity in estimating the position of the mobile device; means for identifying disambiguation information that can be used to resolve the ambiguity in the position of the mobile device; means for requesting disambiguation information for resolving the ambiguity associated with the position of the mobile device; means for receiving the disambiguation information for resolving the ambiguity associated with the position of the mobile device; means for resolving the ambiguity in estimating the position of the mobile device using the disambiguation information; and means for determining the position of the mobile device in the indoor environment.

Implementations of such an apparatus may include one more of the following features. The means for requesting the disambiguation information for resolving the ambiguity associated with the position of the mobile device includes means for displaying a multiple choice question on a display of the mobile device. The means for displaying the multiple choice question on the display of the mobile device includes means for resizing other running applications being displayed on the display to provide a portion of the display in which the multiple choice question can be displayed on the display of the mobile device. The indoor environment includes multiple floors, and the ambiguity in estimating the position of the mobile device is associated with determining which floor of the multiple floors of the indoor environment on which the mobile device is located. The means for requesting the disambiguation information for resolving the ambiguity associated with the position of the mobile device includes means for requesting information identifying a floor of the indoor environment on which the mobile device is located. The means for requesting the disambiguation information for resolving the ambiguity associated with the position of the mobile device includes means for prompting for information identifying visible landmarks in the indoor environment located proximate to the mobile device. The means for resolving the ambiguity in estimating the position of the mobile device using the disambiguation information includes means for selecting a position determination algorithm based at least in part on the disambiguation information. The means for determining the position of the mobile device in the indoor environment includes means for downloading a map of wireless access points from a server, the map of wireless access points being associated with a floor of the indoor environment on which the mobile device is estimated to be located. The means for requesting the disambiguation information for resolving the ambiguity associated with the position of the mobile device includes means for sending a request for the disambiguation information to a remote server, and the means for receiving the disambiguation information includes means for receiving the disambiguation information from the remote server. The disambiguation information is received from a user of the mobile device, and the apparatus includes means for transmitting at least a portion of the disambiguation information received from the user of the mobile device to a remote server.

An example non-transitory computer-readable medium according to the disclosure, has stored thereon computer-readable instructions for determining a position of a mobile device in an indoor environment, comprising instructions configured to cause a computer to: receive a request for the position of the mobile device within the indoor environment from an application running on the mobile device; estimate the position of the mobile device within the indoor environment based on signals received from a plurality of wireless access points responsive to receiving the request for the position of the mobile device; identify an ambiguity in estimating the position of the mobile device; identify disambiguation information for resolving the ambiguity in the position of the mobile device; request disambiguation information for resolving the ambiguity associated with the position of the mobile device; receive the disambiguation information for resolving the ambiguity associated with the position of the mobile device; resolve the ambiguity in estimating the position of the mobile device using the disambiguation information; and determine the position of the mobile device in the indoor environment.

Implementations of such a non-transitory computer-readable medium may include one or more of the following features. The instructions configured to cause the computer to request the disambiguation information for resolving the ambiguity associated with the position of the mobile device include instructions configured to cause the computer to display a multiple choice question on a display of the mobile device. The instructions configured to cause the computer to display the multiple choice question on the display of the mobile device include instructions configured to cause the computer to resize other running applications being displayed on the display to provide a portion of the display in which the multiple choice question can be displayed on the display of the mobile device. The indoor environment includes multiple floors, and the ambiguity in estimating the position of the mobile device is associated with determining which floor of the multiple floors of the indoor environment on which the mobile device is located. The instructions configured to cause the computer to request the disambiguation information for resolving the ambiguity associated with the position of the mobile device include instructions configured to cause the computer to request information identifying a floor of the indoor environment on which the mobile device is located. The instructions configured to cause the computer to request the disambiguation information for resolving the ambiguity associated with the position of the mobile device include instructions configured to cause the computer to prompt the user for information identifying visible landmarks in the indoor environment located proximate to the mobile device. The instructions configured to cause the computer to resolve the ambiguity in estimating the position of the mobile device using the disambiguation information include instructions configured to cause the computer to select a position determination algorithm based at least in part on the disambiguation information. The instructions configured to cause the computer to determine the position of the mobile device in the indoor environment include instructions configured to cause the computer to download a map of wireless access points from a server, and the map of wireless access points is associated with a floor of the indoor environment on which the mobile device is estimated to be located. The instructions configured to cause the computer to request the disambiguation information for resolving the ambiguity associated with the position of the mobile device include instructions configured to cause the computer to send a request for the disambiguation information to a remote server, and the instructions configured to cause the computer to receive the disambiguation information include instructions configured to cause the computer to receive the disambiguation information from the remote server. The disambiguation information is received from a user of the mobile device, and the non-transitory computer-readable medium includes instructions configured to cause the computer to transmit at least a portion of the disambiguation information received from the user to a remote server.

An example apparatus for determining a position of a mobile device in an indoor environment according to the disclosure includes a transceiver configured to transmit and receive wirelessly, a memory configured to processor-executable program code, and a processor. The processor is configured to receive a request for the position of the mobile device within the indoor environment from an application running on the mobile device; estimate the position of the mobile device within the indoor environment based on signals received from a plurality of wireless access points responsive to receiving the request for the position of the mobile device; identify an ambiguity in estimating the position of the mobile device; identify disambiguation information for resolving the ambiguity in the position of the mobile device; request disambiguation information for resolving the ambiguity associated with the position of the mobile device; receive the disambiguation information for resolving the ambiguity associated with the position of the mobile device; resolve the ambiguity in estimating the position of the mobile device using the disambiguation information; and determine the position of the mobile device in the indoor environment.

Implementations of such an apparatus may include one or more of the following features. The processor being configured to request the disambiguation information for resolving the ambiguity associated with the position of the mobile device is further configured to display a multiple choice question on a display of the mobile device. The processor being configured to display the multiple choice question on the display of the mobile device is further configured to resize other running applications being displayed on the display of the mobile device to provide a portion of the display in which the multiple choice question can be displayed on the display of the mobile device. The indoor environment includes multiple floors; and the ambiguity in estimating the position of the mobile device is associated with determining which floor of the multiple floors of the indoor environment on which the mobile device is located. The processor being configured to request the disambiguation information for resolving the ambiguity associated with the position of the mobile device is further configured to request information identifying a floor of the indoor environment on which the mobile device is located. The processor being configured to request the disambiguation information for resolving the ambiguity associated with the position of the mobile device is further configured to prompt for information identifying visible landmarks in the indoor environment located proximate to the mobile device. The processor being configured to resolve the ambiguity in estimating the position of the mobile device using the disambiguation information is further configured to select a position determination algorithm based at least in part on the input received from the user. The processor being configured to determine the position of the mobile device in the indoor environment is further configured to download a map of wireless access points from a server, the map of wireless access points being associated with a floor of the indoor environment on which the mobile device is estimated to be located. The processor being configured to request the disambiguation information for resolving the ambiguity associated with the position of the mobile device is further configured to send a request for the disambiguation information to a remote server, and wherein the processor being configured to receive the disambiguation information further comprises the processor being configured to receive the disambiguation information from the remote server. The disambiguation information is received from a user of the mobile device, and the processor is further configured to: transmit at least a portion of the disambiguation information received from the user to a remote server.

An example method for determining a position of a mobile device in an indoor environment according to the disclosure includes sending a request from the mobile device for disambiguation information for the indoor environment; receiving a response from the server providing disambiguation information for the indoor environment; receiving a request for the position of the mobile device within the indoor environment from an application running on the mobile device; estimating the position of the mobile device within the indoor environment based on signals received from a plurality of wireless access points responsive to receiving the request for the position of the mobile device; identifying an ambiguity in estimating the position of the mobile device; identifying disambiguation information for resolving the ambiguity in the position of the mobile device; determining whether the identified disambiguation information for resolving the ambiguity is included in the disambiguation information received from the server; resolving the ambiguity in estimating the position of the mobile device using the disambiguation information received from the server if the identified disambiguation information for resolving the ambiguity is included in the disambiguation information received from the server; and determining the position of the mobile device within the indoor environment.

Implementations of such a method may include one or more of the following features. Prompting for information from a user of the mobile device that can be used to resolve the ambiguity if the identified disambiguation information for resolving the ambiguity is not included in the disambiguation information received from the server, receiving the information from the user responsive to prompting for the information from the user; and resolving the ambiguity in estimating the position of the mobile device using the information received from the user. Prompting the user of the mobile device for information that can be used to resolve the ambiguity includes displaying a multiple choice question on a display of the mobile device. Sending the information received from the user of the mobile device to the server.

An example method for determining a position of a mobile device in an indoor environment according to the disclosure includes means for sending a request from the mobile device for disambiguation information for the indoor environment; means for receiving a response from the server providing disambiguation information for the indoor environment; means for receiving a request for the position of the mobile device within the indoor environment from an application running on the mobile device; means for estimating the position of the mobile device within the indoor environment based on signals received from a plurality of wireless access points responsive to receiving the request for the position of the mobile device; means for identifying an ambiguity in estimating the position of the mobile device; means for identifying disambiguation information for resolving the ambiguity in the position of the mobile device; means for determining whether the identified disambiguation information for resolving the ambiguity is included in the disambiguation information received from the server; means for resolving the ambiguity in estimating the position of the mobile device using the disambiguation information received from the server if the identified disambiguation information for resolving the ambiguity is included in the disambiguation information received from the server; and means for determining the position of the mobile device within the indoor environment.

Implementations of such an apparatus may include one or more of the following features. Means for prompting for information from a user of the mobile device that can be used to resolve the ambiguity if the identified disambiguation information for resolving the ambiguity is not included in the disambiguation information received from the server; means for receiving the information from the user responsive to prompting for the information from the user; and means for resolving the ambiguity in estimating the position of the mobile device using the information received from the user. The means for prompting the user of the mobile device for information that can be used to resolve the ambiguity includes means for displaying a multiple choice question on a display of the mobile device. Means for sending the information received from the user of the mobile device to the server.

An example non-transitory computer-readable medium according to the disclosure, has stored thereon computer-readable instructions for determining a position of a mobile device in an indoor environment. The instructions are configured to cause a computer to: send a request from the mobile device for disambiguation information for the indoor environment; receive a response from the server providing disambiguation information for the indoor environment; receive a request for the position of the mobile device within the indoor environment from an application running on the mobile device; estimate the position of the mobile device within the indoor environment based on signals received from a plurality of wireless access points responsive to receiving the request for the position of the mobile device; identify an ambiguity in estimating the position of the mobile device; identify disambiguation information for resolving the ambiguity in the position of the mobile device; determine whether the identified disambiguation information for resolving the ambiguity is included in the disambiguation information received from the server; resolve the ambiguity in estimating the position of the mobile device using the disambiguation information received from the server if the identified disambiguation information for resolving the ambiguity is included in the disambiguation information received from the server; and determine the position of the mobile device within the indoor environment.

Implementations of such a non-transitory computer-readable medium may include one or more of the following features. Instructions to cause the computer to: prompt for information from a user of the mobile device that can be used to resolve the ambiguity if the identified disambiguation information for resolving the ambiguity is not included in the disambiguation information received from the server; receive the information from the user responsive to prompting for the information from the user; and resolve the ambiguity in estimating the position of the mobile device using the information received from the user. The instructions to cause the computer to prompt the user of the mobile device for information that can be used to resolve the ambiguity include instructions to cause the computer to display a multiple choice question on a display of the mobile device. Instructions to cause the computer to send the information received from the user of the mobile device to the server.

An example method for determining a position of a mobile device in an indoor environment according to the disclosure includes a transceiver configured to transmit and receive data wirelessly, a memory configured to store processor-executable program code, and a processor. The processor is configured to: send a request from the mobile device for disambiguation information for the indoor environment; receive a response from the server providing disambiguation information for the indoor environment; receive a request for the position of the mobile device within the indoor environment from an application running on the mobile device; estimate the position of the mobile device within the indoor environment based on signals received from a plurality of wireless access points responsive to receiving the request for the position of the mobile device; identify an ambiguity in estimating the position of the mobile device; identify disambiguation information for resolving the ambiguity in the position of the mobile device; determine whether the identified disambiguation information for resolving the ambiguity is included in the disambiguation information received from the server; resolve the ambiguity in estimating the position of the mobile device using the disambiguation information received from the server if the identified disambiguation information for resolving the ambiguity is included in the disambiguation information received from the server; and determine the position of the mobile device within the indoor environment.

Implementations of such an apparatus may include one or more of the following features. The processor is further configured to: prompt for information from a user of the mobile device that can be used to resolve the ambiguity if the identified disambiguation information for resolving the ambiguity is not included in the disambiguation information received from the server; receive the information from the user responsive to prompting for the information from the user; and resolve the ambiguity in estimating the position of the mobile device using the information received from the user. The processor being configured to prompt the user of the mobile device for information that can be used to resolve the ambiguity is further configured to display a multiple choice question on a display of the mobile device. The processor is further configured to send the information received from the user of the mobile device to the server.

An example method for providing information to assist determining a position of a mobile device in an indoor environment according to the disclosure includes receiving a request for disambiguation information associated with the indoor environment from the mobile device, the disambiguation information including information for resolving an ambiguity associated with determining the position of the mobile device; retrieving the disambiguation information from a data store; and sending the disambiguation information to the mobile device.

Implementations of such a method may include one or more of the following features. Receiving updated disambiguation information from the mobile device, and updating the disambiguation information in the data store with the updated disambiguation information.

An example apparatus for providing information to assist determining a position of a mobile device in an indoor environment according to the disclosure includes means for receiving a request for disambiguation information associated with the indoor environment from the mobile device, the disambiguation information including information for resolving an ambiguity associated with determining the position of the mobile device; means for retrieving the disambiguation information from a data store; and means for sending the disambiguation information to the mobile device.

Implementations of such an apparatus may include one or more of the following features. Means for receiving updated disambiguation information from the mobile device, and means for updating the disambiguation information in the data store with the updated disambiguation information.

An example non-transitory computer-readable medium according to the disclosure, has stored thereon computer-readable instructions for determining a position of a mobile device in an indoor environment. The instructions are configured to cause a computer to: receive a request for disambiguation information associated with the indoor environment from the mobile device, the disambiguation information including information for resolving an ambiguity associated with determining the position of the mobile device; retrieve the disambiguation information from a data store; and send the disambiguation information to the mobile device.

Implementations of such a non-transitory computer-readable medium may include one or more of the following features. Instructions to cause the computer to receive updated disambiguation information from the mobile device, and update the disambiguation information in the data store with the updated disambiguation information.

An example apparatus for providing information to assist determining a position of a mobile device in an indoor environment according to the disclosure includes a network interface configured to transmit and receive data via one or more networks, a memory configured to store processor-executable program code; and a processor. The processor is configured to receive a request for disambiguation information associated with the indoor environment from the mobile device, the disambiguation information including information for resolving an ambiguity associated with determining the position of the mobile device, retrieve the disambiguation information from a data store, and send the disambiguation information to the mobile device.

Implementations of such an apparatus may include one or more of the following features. The processor is further configured to receive updated disambiguation information from the mobile device via the network interface, and the processor is further configured to update the disambiguation information in the data store with the updated disambiguation information.

Items and/or techniques described herein may provide one or more of the following capabilities, as well as other capabilities not mentioned.

BRIEF DESCRIPTIONS OF THE DRAWINGS

Figure 9A:
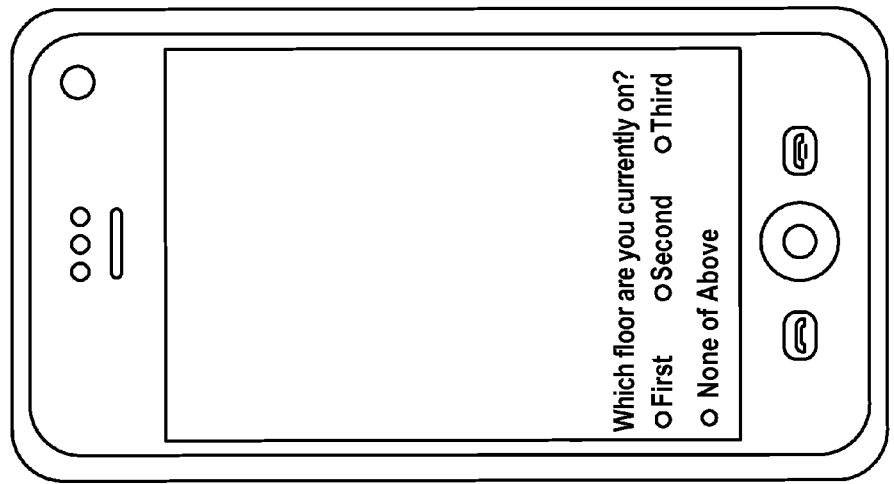
Figure 9B:
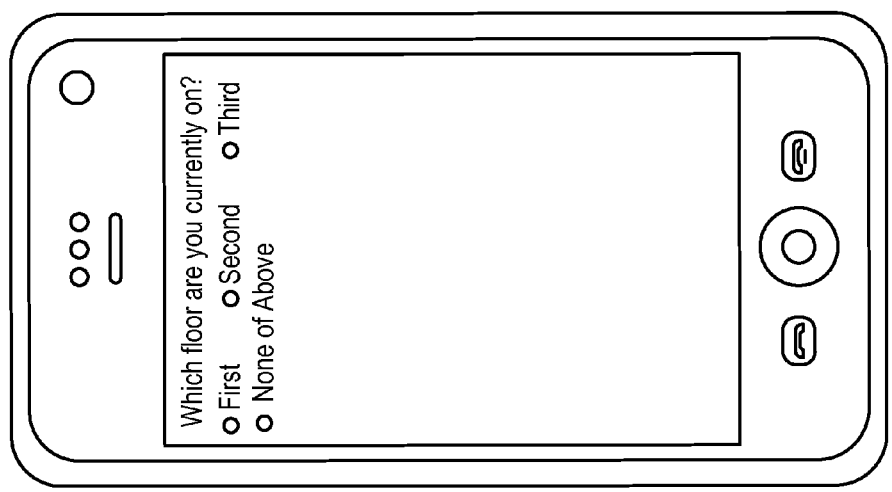
Figure 9C:
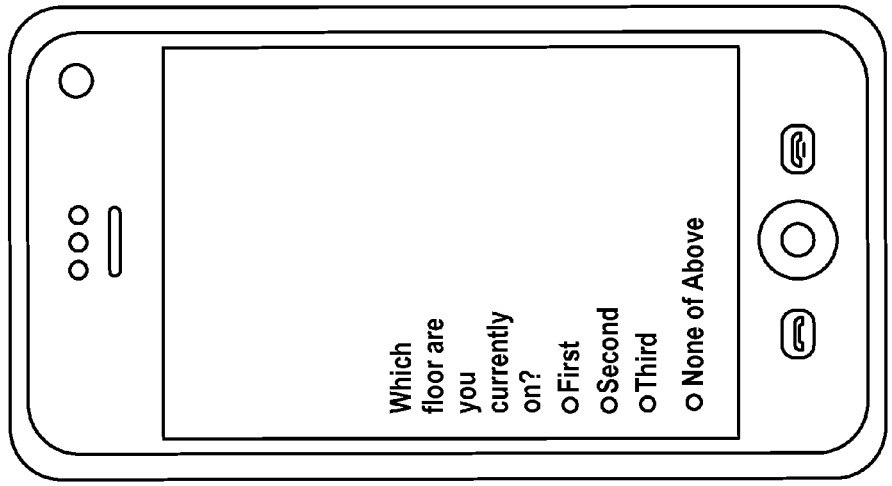

FIGS. 9A, 9B, and 9C illustrate examples of a query for disambiguation information on the user interface of a mobile device.

Figure 10A:
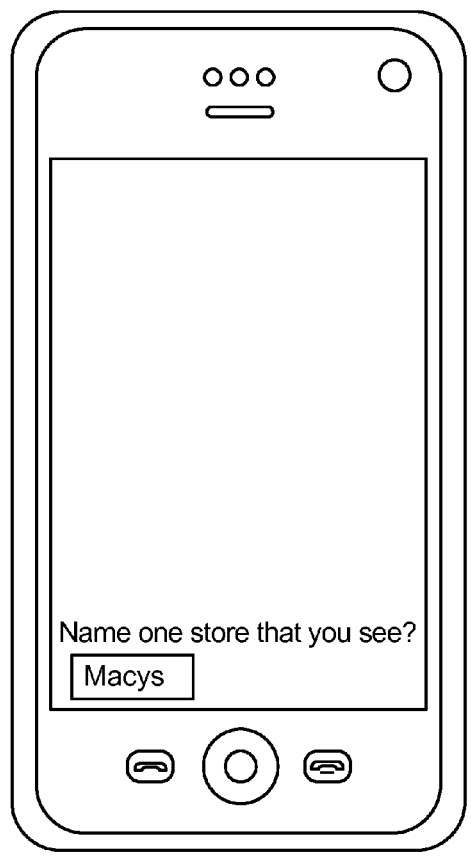
Figure 10B:
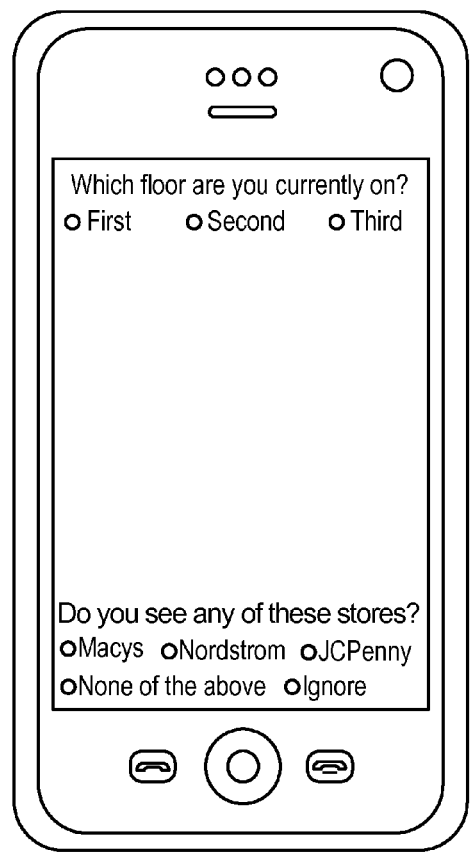

FIGS. 10A and 10B illustrate additional examples of a query for disambiguation information on the user interface of a mobile device.

FIGS. 11A and 11B illustrate an example of a query for disambiguation information on the user interface of a mobile device being displayed alongside an application that has requested position information from the positioning engine of the mobile device.

DETAILED DESCRIPTION

Techniques for determining the position of a mobile device within an indoor environment are provided. The mobile device can be configured to identify an ambiguity while determining the position of the mobile device within the indoor environment and to identify information that can be used to resolve this ambiguity. For example, the mobile device can include a positioning engine that can be used to determine the position of the mobile device within the indoor environment. The positioning engine may, while attempting to determine the position of the mobile device within the indoor environment, reach a state where multiple decisions associated with the position of the mobile device appear to be equally probable or nearly equally probable. Simply choosing one of these decisions associated with the position of the mobile device could result in the positioning engine wasting time and processor resources on an incorrect result, which can lead to the positioning engine providing incorrect position information to the user of the mobile device and/or to a requesting application and could also result in the mobile device downloading assistance data for an incorrect LCI. For example, the positioning engine may reach a state where the positioning engine has determined that the probability that mobile device is on the first floor of the indoor environment or on the second floor of the indoor environment are equal or nearly equal (e.g. the probabilities within a predetermined threshold range from one another). In another example, the positioning engine can be configured to execute multiple position determination algorithms that use information available to the mobile device, such as information associated with signals received at the mobile device from wireless APs and/or other information, to determine a position of the mobile device within the indoor environment. In some instances, the position determination algorithms can lead to an ambiguous result where two or more of the algorithms provide conflicting results regarding the position of the mobile device. For the purposes of this disclosure, the terms "position" and "location" have been used interchangeably to refer to a point or place in an indoor environment where a mobile device may be located.

The positioning engine can be configured to resolve an ambiguity in determining the position of the mobile device by requesting user input from the user of the mobile device or using crowd sourced information collected from users of mobile devices within the same indoor environment. For example, the positioning engine can be configured to request disambiguation information from a user of the mobile device and/or request disambiguation information from a remote server. The remote server can be a location server or other server associated with a network service provider associated with the mobile device or may be a service provided by a third party not associated with the network service provider. The disambiguation information can also be provided by an owner or manager of an indoor environment that wants to provide improved indoor navigation capabilities for users of mobile devices, such as mobile phones, tablet computers, and/or other devices within the indoor environment. The indoor environment can be a shopping mall, a hotel, an office building, a convention center, and/or other indoor environment where the user of the mobile device may wish to receive location-based services on the mobile device, such as navigation, maps, and/or other applications that provide information and/or services to the user of the mobile device based on the position of the mobile device within the indoor environment.

The disambiguation information may include one or more of the following types of information that may be used to resolve an ambiguity associated with estimating the position of the mobile device within an indoor environment. The disambiguation information can include information requested from and received from a user of the mobile device that the positioning engine of the mobile device can use to resolve the ambiguity. The disambiguation information requested from and received from the user of the mobile device can include information identifying the floor or which the mobile device is currently located, landmark information proximate to the mobile device, and/or other information that may assist the positioning engine to resolve an ambiguity in the location of the mobile device. For example, the disambiguation information may include information identifying one or more landmarks, such as retail establishments or other readily identifiable portions of the indoor environment that are visible to the user of the mobile device from the current position of the mobile device.

The disambiguation information can also comprise information provided by one or more other mobile devices that can be used to resolve the ambiguity associated with estimating the position of the mobile device within the indoor environment. For example, the disambiguation information can include information that identifies one or more position determination algorithms that have previously provided better results in a particular indoor environment or portion of an indoor environment. The mobile device can use this disambiguation information to resolve ambiguities associated with conflicting results provided by two more position determination algorithms used by the position determination engine. The disambiguation can also include information provided by one or more mobile device that identifies which RSSI (received signal strength indication) or RTT (round-trip time) measurements may be more trustworthy for a particular indoor environment. For example, a RSSI or RTT measurements associated with a particular wireless access point can be affected if the indoor environment is modified, such as due to structural changes to the building. The position of a particular wireless access point may be incorrect or out of date in the map information associated with a particular indoor environment, which could result in the unreliable RTT or RSSI measurements using that particular wireless access point and incorrect estimates of the position of the mobile device in the environment based on the unreliable RTT or RSSI measurement. A mobile device could use such information to disregard such wireless points when making RTT or RSSI measurements and/or correct for incorrect positional information associated with such a wireless access point where applicable.

Figure 1:
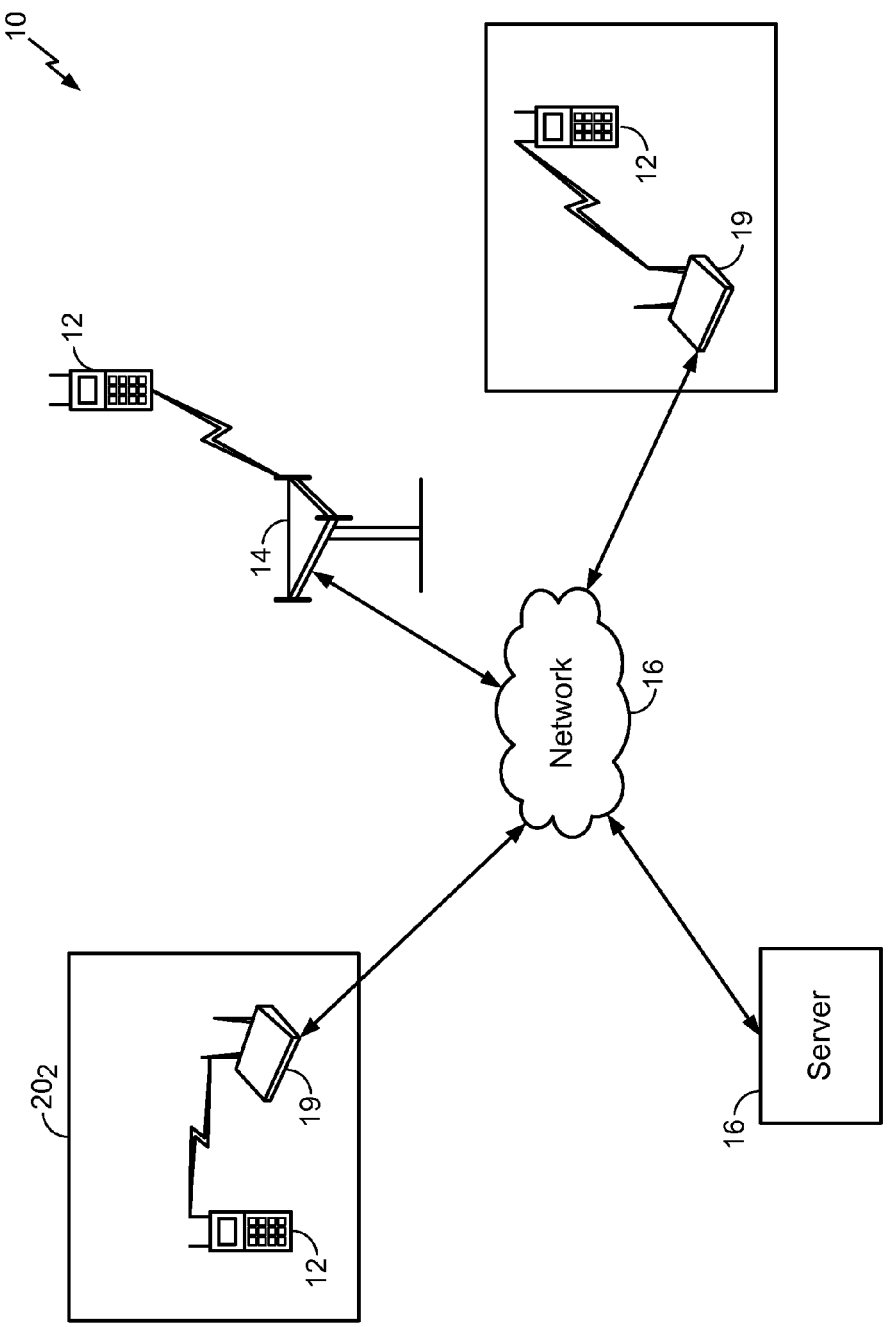
FIG. 1 is a simplified diagram of a communication system.
Figure 2:
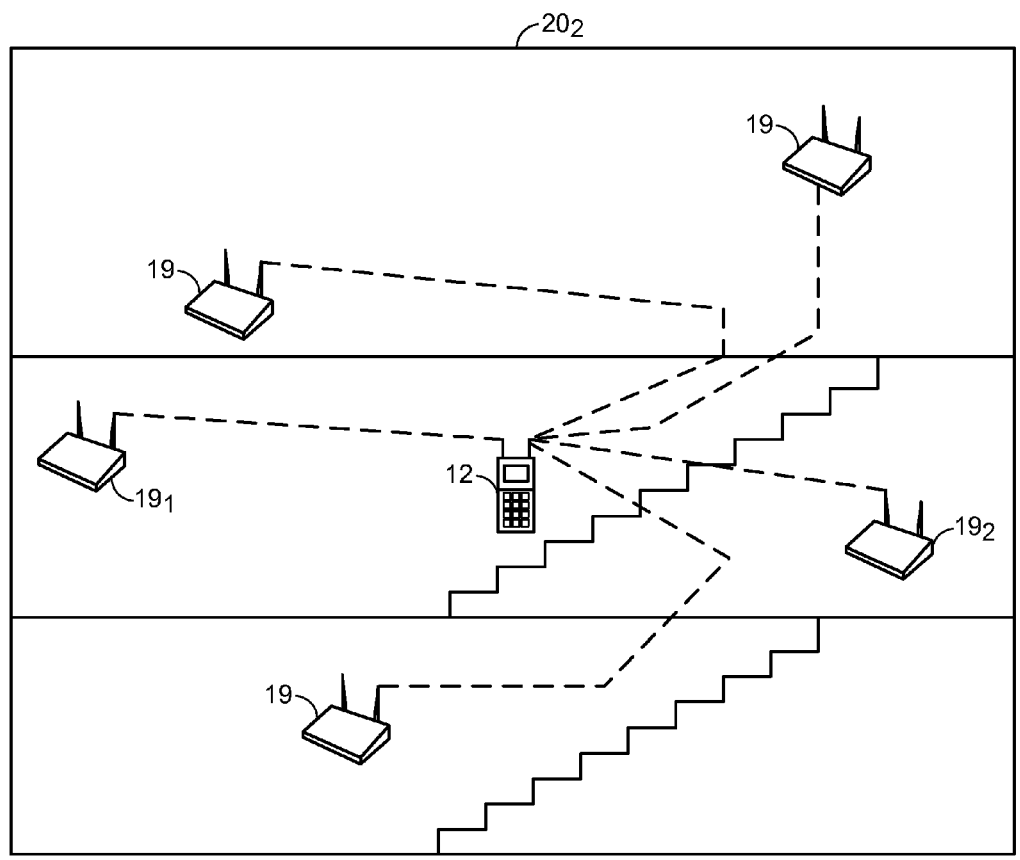
FIG. 2 is a simplified diagram of access points and a mobile device in a building shown in FIG. 1.

Referring to FIGS. 1 and 2, a communication system 10 includes mobile devices 12, a base transceiver station 14, a network 16, a server 18, and wireless transceiver access points (APs) 19 disposed in buildings 20. The system 10 is a communication system in that the system 10 can at least send and receive communications. Although only one server 18 is shown for simplicity, more than one server 18 may be used in the system 10, e.g., in various locations to provide quicker access as the system 10 may span large regions, e.g., entire countries or continents, or even the planet.

The base transceiver station 14 can wirelessly communicate with the mobile devices 12 via antennas. Each of the base transceiver stations 14 may also be referred to as an access point, an access node (AN), a Node B, an evolved Node B (enB), etc. The base transceiver stations 14 are configured to communicate wirelessly with the mobile devices 12 under the control of the server 18 (via the network 16). The network 16 can comprise one or more wired or wireless networks and can be implemented at least in part by the Internet.

The mobile devices 12 can be moved to various locations, including into the buildings 20 and onto different floors of the buildings 20. The mobile devices 12 may be referred to as access terminals (ATs), mobile stations, user equipment (UE), or subscriber units. The mobile devices 12 are shown here as mobile phones. Other examples of MSs include wireless routers, personal digital assistants (PDAs), netbooks, notebook computers, tablet computers, etc. Only one mobile device 12 is shown in FIG. 2, and to simplify the discussion below only this mobile device 12 is discussed.

Figure 3:
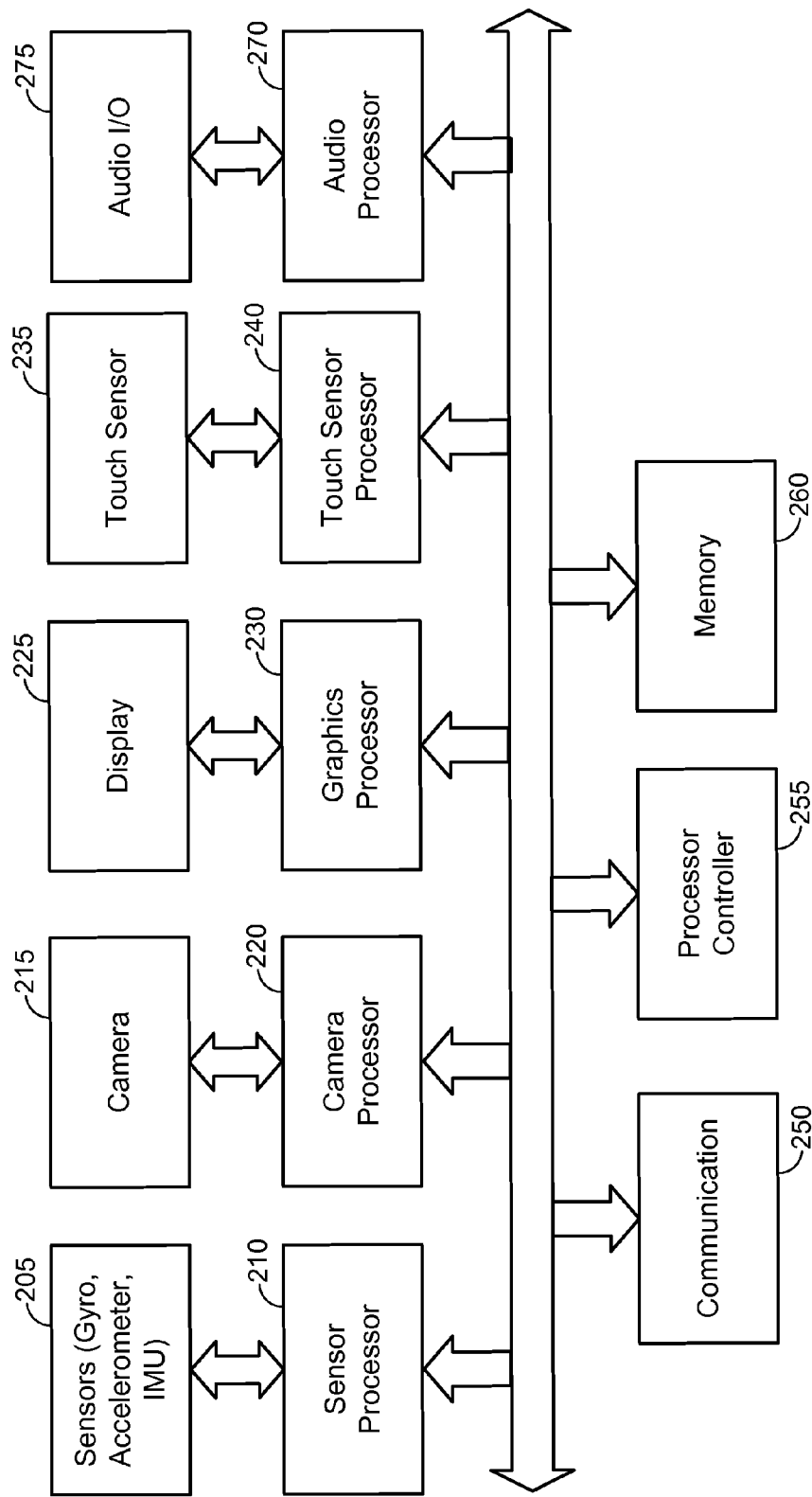
FIG. 3 is a functional block diagram of the mobile device that can be used to implement the mobile devices illustrated in FIGS. 1 and 2.

FIG. 3 is an example of a system architecture that can be used to implement a mobile device, such as the mobile devices 12. A mobile device 12 may include some or all of the components illustrated in FIG. 3 and may include additional components not illustrated in FIG. 3. The mobile device 12 can include sensors 205 (e.g., gyros, accelerometers, an inertial measurement unit (IMU) and/or other types of sensors) and a sensor processor 210 for processing data collected by the sensors 205. Data collected by the sensors may be used to determine an orientation of the mobile device, acceleration or velocity of the mobile device, and/or other information that may be useful in determining the position of the mobile device 12. The data collected by the sensors 205 can also be used to provide inputs to one or more applications on the mobile device 12, including the positioning engine used to determine at position of the mobile device 12.

The mobile device 12 can also include a camera 215 and a camera processor 220. The camera 215 can be configured to capture images and/or video content. The camera processor 220 can be configured to process the data collected by the camera 215 and to convert the data collected by the camera into a format that can be used by one or more applications on the mobile device 12 and/or viewed on the display 225 of the mobile device 12. The camera processor 220 can be configured to perform various types of image or video processing on the data collected from the camera to prepare the content for display on display 225.

The display 225 can be touch screen interface that includes touch sensor 235. The graphics processor 230 can be used to generate graphical data for display on display 225. Applications on the mobile device 12 and/or other executable programs, such as the operating system and the positioning engine, can be implemented in software and/or hardware and can be configured to send commands to the graphics processor 230 to display image or video content on the display 225. Touch sensor processor 240 can process data output by the touch sensor 235 to identify when a user touches the touch screen. The touch sensor process 240 can be configured to identify various touch gestures, including multi-finger touches of the touch screen. The operating system, applications, and/or the positioning engine can use the gesture information determined by the touch sensor processor 240 to determine, at least in part, receive and respond to user input.

The audio I/O component 275 can comprise a speaker and/or other audio output components, such as a headphone jack for outputting audio content. The audio I/O component 275 can also include a microphone for receiving audio input from a user of the mobile device 12. The audio processor 270 can be configured to process audio data output by the audio I/O component 275 and to output audio content the audio I/O component 275. The audio I/O component 275 and the audio processor 270 can be used to output audio prompts to a user and/or to receive audio responses from a user of the mobile device.

The communications controller 250 can be configured to enable the device to communicate using one or more wireless protocols. The communications controller 250 can be configured to allow the device to send and receive data from nearby wireless devices, including wireless access point and other AR-enabled devices. The memory 260 includes volatile and/or persistent memory for storing data used by various components of the AR-enabled device. The memory 260 can be used to store processor-executable program code for one or more of the processors included in the device. In some instances, the augmentation logic can be implemented as processor-executable instructions stored in the memory 260. The processor controller 255 can be configured to control one or more of the sensor processor 210, camera processor 220, the graphics processor 230, and the touch sensor processor 240. One or more of the sensor processor 210, camera processor 220, the graphics processor 230, the touch sensor processor 240, and the audio processor 270 may also be implemented by the processor controller 255.

Figure 5:
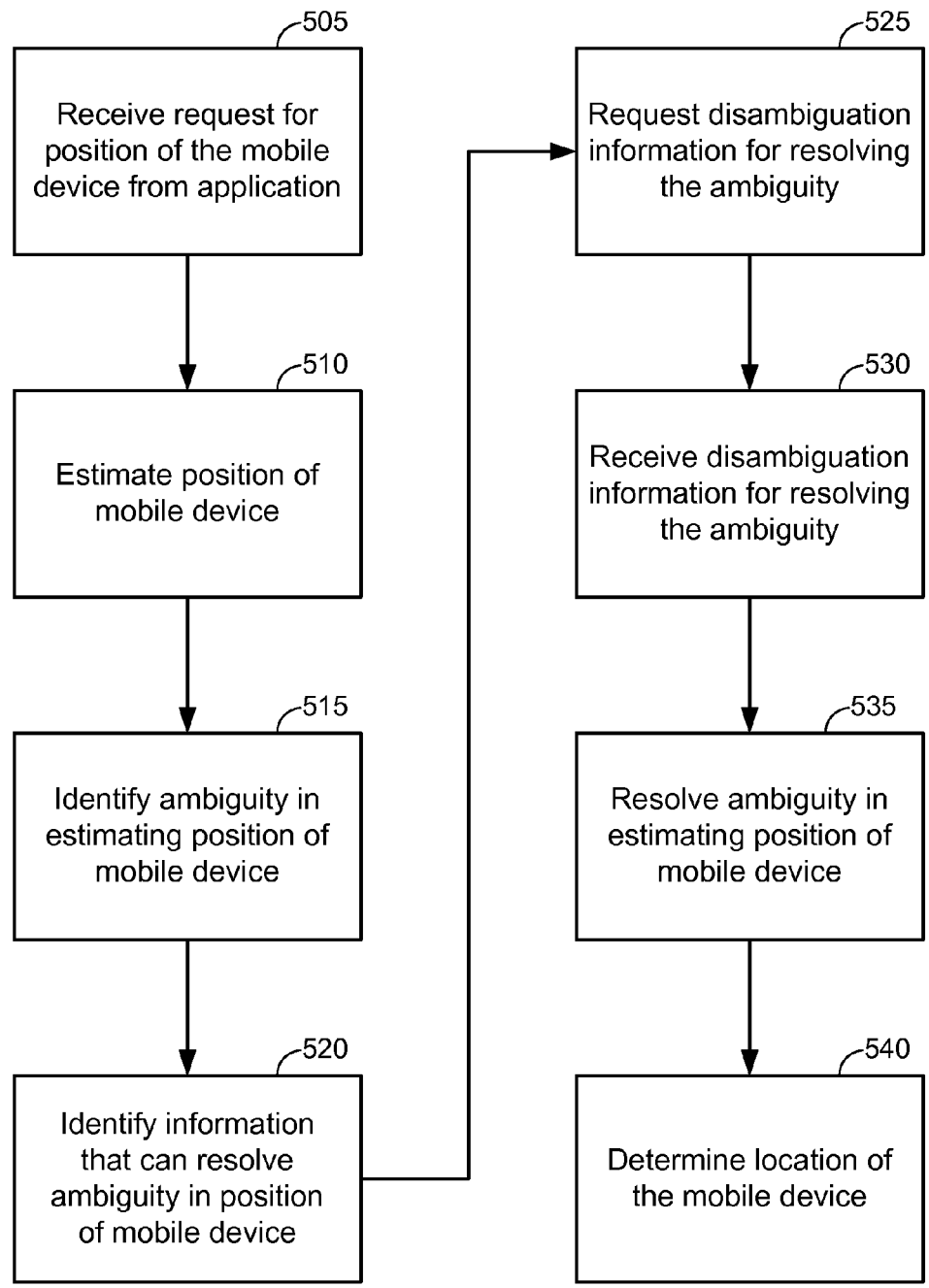
FIG. 5 is a block flow diagram of a process for determining the position of a mobile device using disambiguation information provided by a user of the mobile device.
Figure 6:
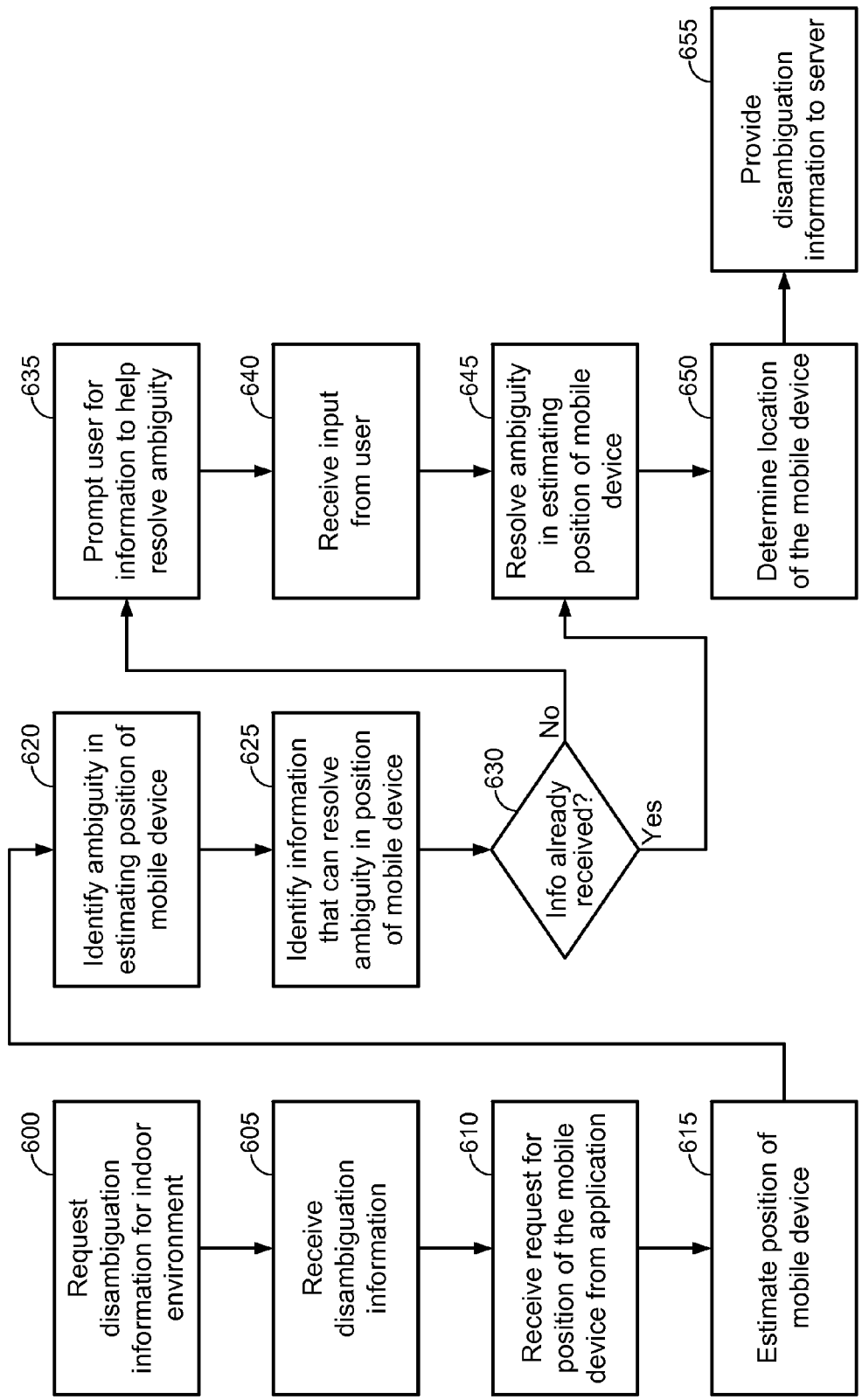
FIG. 6 is a block flow diagram of another process for determining the position of a mobile device using cached disambiguation information or disambiguation information provided by a user of the mobile device.

The mobile device 12 can be configured to implement various functions, such as the techniques illustrated in FIGS. 5 and 6.

Figure 4:
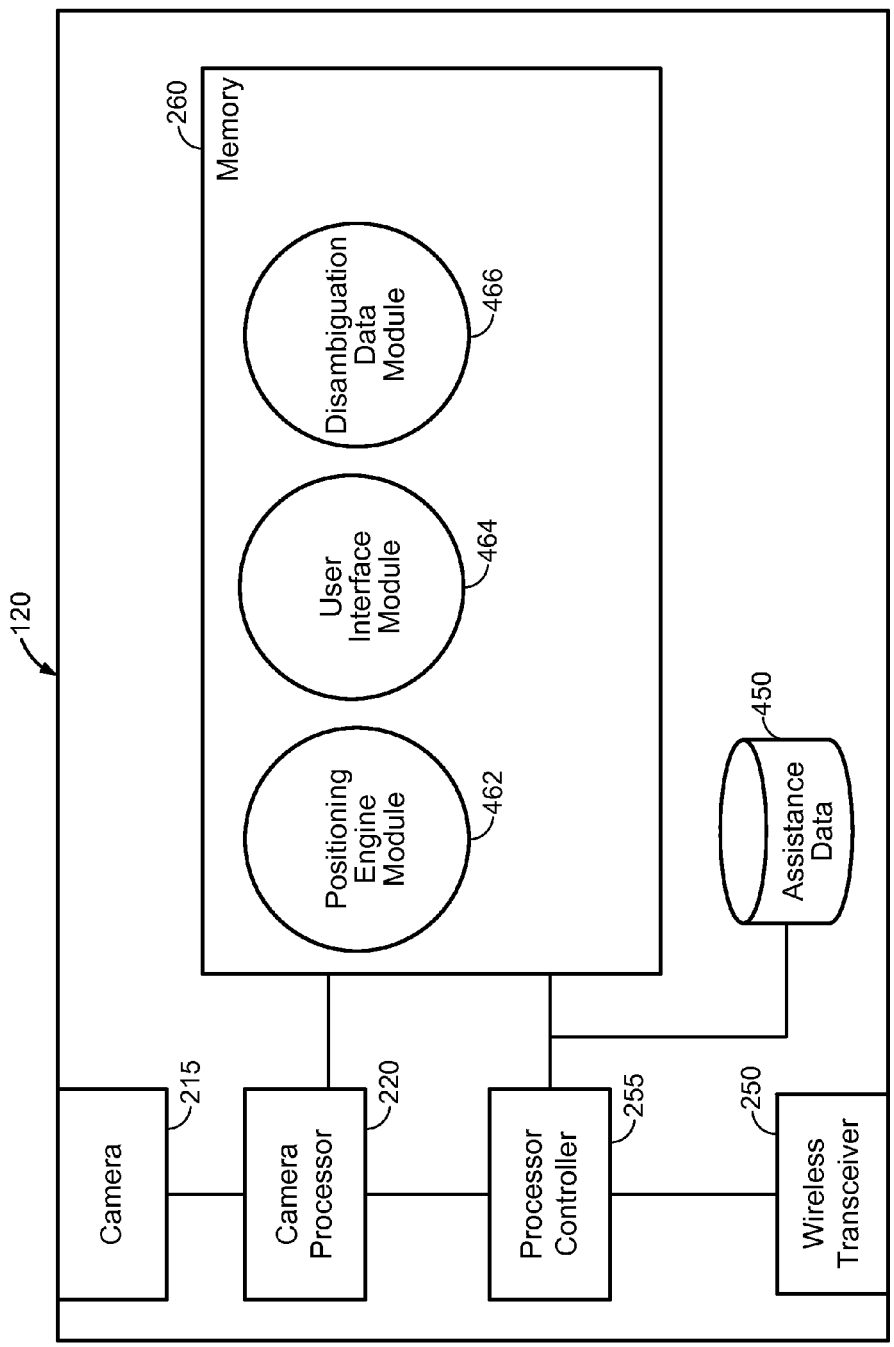
FIG. 4 is a functional block diagram of the mobile device illustrated in FIG. 3 that illustrates the functional modules not shown in FIG. 3.

FIG. 4 is a block diagram of the of the mobile device 12 illustrated in FIG. 3 that illustrates functional modules that may be implemented as processor executable software code stored in memory 260. The functional modules illustrated in FIG. 4 can alternatively be stored either in part or in whole in a different computer-readable memory. For example, the functional modules may be stored in a removable computer-readable medium associated with the mobile device 12, such as a flash memory, a SD-Card, or other type of removable memory. The functional modules illustrated in FIG. 4 can also be implemented in part or in whole in firmware and/or hardware.

The mobile device 12 can include a positioning engine module 462, a user interface module 464, and a disambiguation data module 466. The positioning engine module 462 can be configured to determine the position of the mobile device 12.

The positioning engine module 462 can be configured to receive requests for the position of the mobile device 12 from applications operating on the mobile device 12 that are configured to provide location-based services to the user of the mobile device 12. For example, a mapping application on the mobile device 12 might display the position of the user on a map of the indoor environment on the mobile device 12. In another example, an application on the mobile device 12 might display sale information or special offer information on the display 225 of the mobile device 12 for retailers proximate to the position of the mobile device 12. In yet another example, the mobile device 12 can include an application that allows a user to search for retailers offering a desired type of goods or services and to provide directions through the indoor environment to the user of the mobile device. Other types of applications that make use of the position of the mobile device 12 can also request the position of the mobile device 12 from the positioning engine module 462. The applications may also be stored in the memory 260 or in another memory of the mobile device 12.

The positioning engine module 462 can be implemented as firmware and/or software and can be implemented as part of the operating system of the mobile device 12 or as a separate application on the mobile device 12. The positioning engine module 462 can be configured to determine the position of the mobile device 12 in various ways. For example, the positioning engine module 462 can be configured to perform trilateration using signal measurements (e.g., RSSI (received signal strength indication), RTT (round-trip time)), time of arrival (TOA), and/or disambiguate between multiple possible disambiguation regions (e.g., floors) within an indoor environment, e.g., using RSSI and/or RTT measurements and known positions of the wireless access points 19 and/or base transceiver stations 14. The positioning engine module 462 can also be configured to determine the position of the mobile device 12 using signals received from a Satellite Positioning System (SPS) receiver associated with the mobile device 12 to determine the position of the mobile device 12 when outdoors and a line of site to a sufficient number of satellites. For example, the positioning engine module 462 can be configured to determine the position of the mobile device 12 using signals from APs to determine the position of the mobile device 12 within an indoor environment. The positioning engine module 462 can be configured to prompt a user for disambiguation data to resolve an ambiguity when two or more of the position determination algorithms used by the positioning engine module 462 arrive at conflicting results regarding the position of the mobile device SPS systems, such as the Global Positioning System (GPS), Galileo, GLONASS, and/or other SPS systems. The positioning engine module 462 can be configured to use multiple position determination algorithms within the indoor environment. Other types of ambiguities regarding the position of the mobile device 12 within the indoor environment can also arise and are described in greater detail below.

The positioning engine module 462 can also be configured to receive assistance data from the wireless communication network. The positioning engine module can use the information included in the assistance data to determine the LCI within the indoor environment in which the mobile device 12 is located. The positioning engine module 462 can be configured to request assistance data associated with the LCI from a network server or location server, such as server 18, if the assistance data is not already stored on the mobile device 12. The size of the assistance data associated with an LCI can be quite large and would consume a significant portion of the limited memory of the mobile device 12. As a result, the mobile device 12 may need to request the assistance data as required. To conserve both network and mobile device 12 resources, the mobile device 12 may only be configured to request the assistance data from the location server once the mobile device 12 is relatively certain as to which LCI the mobile device is currently in. The assistance data can include various information that the mobile device 12 can use to determine its position. For example, the assistance data can include map information for the indoor environment that can include information that the mobile device 12 can used to determine its position within the indoor environment. For example, the assistance data can identify the position of one or more wireless access points or wireless base stations. The assistance data can also include information that identifies which wireless access points or wireless base stations are on which floor of the indoor environment. The assistance data may also include additional information about the indoor environment, such as the position of stairs, atrium, hallways, escalator, elevators, and/or other structural elements of the indoor environment. The positioning engine module 462 can be configured to store assistance data received from the network in a local data store 450 to avoid having to retrieve the data from the network when needed in the future. The positioning engine module 462 can be configured to timestamp the assistance data stored in the local data store 450 to automatically expire after a predetermined amount of time, to ensure that the data in the local data store 450 does not become out of date due to changes in the configuration of the wireless network associated with the indoor environment.

User interface module 464 can be configured to provide audiovisual content to the user via various output devices on the mobile device 12, such as speakers, headphone ports, displays (e.g., display 225), and/or haptic feedback devices, such as a vibrating motor that can vibrate the mobile device 12. The user interface module 464 can provide visual interface for interacting with the mobile device 12, such as displaying buttons, windows, etc. on the display 225 of the mobile device 12. The user interface module 464 can also be configured to provide an audio or voice interface to the mobile device that allows the user to interact with applications on the phone via a voice interface. The user interface module 464 can also be configured to receive user input from a touch sensor 235, via sensors 205, and/or via buttons or keys included on the mobile device 12.

The positioning engine module 462 can be configured to instruct the user interface module 464 to display a textual or graphical query on the display 225 of the mobile device 12 prompting the user of the mobile device 12 for disambiguation information. The disambiguation information can be used by the positioning engine module 462 to resolve an ambiguity in determining the position of the mobile device 12. For example, the mobile device 12 may be located in a portion of an indoor environment where it is equally probable or nearly equally probable that the mobile device 12 could be located in two different LCIs or on two different floors of an indoor environment. One example where such a situation might occur is where the mobile device 12 is located in an atrium other area of the indoor environment where the mobile device 12 is able to receive signals from wireless access points on multiple floors and the positioning engine module 462 may determine that it is nearly equally probable that the mobile device 12 is more than one floor. To help resolve this ambiguity, the positioning engine module 462 can be configured to prompt the user for disambiguation information that the positioning engine module 462 can use to resolve the ambiguity in determining the position of the mobile device 12.

FIGS. 9A, 9B, and 9C illustrate an example where the positioning engine module 462 has identified information that can be used to resolve the ambiguity in determining the position of the mobile device in an indoor environment, which in this example is information identifying the floor on which the mobile device 12 is located in the indoor environment. The positioning engine module 462 can then generate query for the disambiguation information that the positioning engine module 462 can use to resolve the ambiguity and instruct the user interface module 464 to display this information to the user of the mobile device 12. In the examples illustrated in FIGS. 9A, 9B, and 9C, the positioning engine module 462 prompts the user for the floor of the indoor environment on which the user is located. As can be seen in FIGS. 9A, 9B, and 9C, the user interface module 464 can be configured to display the query to the user at various positions on the display 225 of the mobile device 12. The user interface module 464 can be configured to receive the user's response to the query via touch sensor 235, via a voice response by the user, and/or through one of the other various means of receiving user input discussed above.

FIGS. 10A and 10B illustrate another example of type of disambiguation information that can be requested by positioning engine module 462. In the example illustrated in FIG. 10A, the positioning engine module 462 can request disambiguation information from the user of the mobile device 12 in the form of a fill-in-the-blank type query where the user provides a short answer to the question. In the example illustrated in FIG. 10A, the positioning engine module 462 has requested disambiguation information that includes the name of a retailer located within sight of the user of the mobile device 12. In another example illustrated in FIG. 10B, the positioning engine module 462 has once again requested disambiguation information that includes the name of a retailer within sight of the user of the mobile device 12. In the example illustrated in FIG. 10B, the positioning engine module 462 has presented the query for the disambiguation information in the form of a multiple choice question where the user can select from a list of choices selected by the positioning engine module 462. The positioning engine module 462 can then use the response received from the user to attempt to resolve ambiguities in the position determination process. The positioning engine module 462 can be configured to prompt the user for additional information in one or more follow up queries based on the user's response to the initial query for disambiguation information.

FIGS. 11A and 11B illustrate another example of how the user interface module 464 can be configured to present a query to the user of the mobile device 12. In the example illustrated in FIG. 11, the user of the mobile device has activated a map application for navigating an indoor environment. The map application requests the position of the mobile device from the positioning engine module 462, and the positioning engine module 462 identifies an ambiguity when determining the position of the mobile device. The positioning engine module 462 identifies information that the positioning engine module 462 can use to resolve the ambiguity, in this example, the floor on which the mobile device is located. FIG. 11B illustrates how the user interface module 464 can be configured to display the query on a portion of the display 225 by decreasing the size of the portion of the window allocated to the map application that the user has running on the mobile device 12. The positioning engine module 462 can be configured to bypass the original application, in this example the map application, and directly prompt the user for the information that the positioning engine module 462 can use to attempt to resolve the ambiguity and to determine the position of the mobile device 12.

The mobile device 12 may also include a disambiguation data module 466. The disambiguation data module 466 can be configured to send a request to a server 18 for disambiguation information for a particular indoor environment. Alternatively, the server 18 can be configured to push disambiguation information to the mobile device 12 when the mobile device enters the indoor environment. The disambiguation data module 466 can also be configured to transmit disambiguation information determined by the positioning engine module 462 and/or received from a user of the mobile device in response to a query by the positioning engine module 462 to the server 18. The server 18 can then provide the disambiguation information collected by mobile device 12 in a particular indoor environment to other devices that are in the same indoor environment.

The positioning engine module 462 can be configured to access the disambiguation information provided by the server 18 to determine whether the information that the positioning engine module 462 requires to resolve an ambiguity is available. For example, the disambiguation information can identify which position determination algorithms have provided more accurate results to users of mobile devices in a particular indoor environment. If the positioning engine module 462 identifies an ambiguity in determining the position of the mobile device 12 where two or more position determination algorithms used by the positioning engine module 462 provide conflicting results, the positioning engine module 462 use the disambiguation information for the indoor environment to try to resolve the ambiguity. If other mobile devices 12 have reported that a particular position determination algorithm produced more accurate results for that particular indoor environment, the positioning engine module 462 can be configured to select the results from the same positioning algorithm or algorithms that produced more accurate results for other mobile devices 12. The disambiguation data module 466 can also be configured to store disambiguation information received from the server 18 in the data store 150 on the mobile device 12. The disambiguation data module 466 can also be configured to send disambiguation information to the server 18. For example, if the positioning engine module 462 requests information from the user to resolve an ambiguity in determining the position of the mobile device 12, the disambiguation data module 466 can provide this information to the server. The information collected from the user might be combined with RTT and/or RSSI information that can be used by other mobile devices to resolve an ambiguity in determining the location of a mobile device. The disambiguation data module 466 can also be configured to send other disambiguation information collected from users and/or determined by the mobile device to the server.

FIG. 5 is a block flow diagram of a process for determining the position of a mobile device using disambiguation information provided by a user of the mobile device. The method illustrated in FIG. 5 can be implemented by the mobile device 12 illustrated in FIGS. 1-4. Directly acquiring user feedback can help to resolve situations where decision-making algorithms that are part of the positioning engine have reached a decision point where the decision is too close to call based on the information currently available to the positioning engine.

The process can begin with a positioning engine of the mobile device 12 receiving a request from an application for the position of the mobile device within an indoor environment (stage 505). For example, an application that provides location-based services to the user of the device may request the position of the device. In one example, the application might display sale information or special offers from retailers proximate to the position of the mobile device in the indoor environment. In another example, the application might provide routing information to guide the user of the mobile device from a first position to a second position in the indoor environment. Such a request may be routed to a positioning engine running on the mobile device. The positioning engine can be implemented as part of the operating system of the mobile device and can be implemented as software, firmware, or a combination thereof. The positioning engine may also be implemented as a process running in the background of the mobile device that is configured to provide position information for the mobile device in response to requests for position information from applications running on the mobile device and/or from external entities authorized to request the position of the mobile device. For example, in some implementations, the mobile device can be configured to respond to requests for the position of the mobile device from a location server associated with a mobile network provider.

The position of the mobile device 12 can then be estimated (stage 510). The position of the mobile device 12 can be estimated using various techniques. For example, the position of the mobile device 12 might be estimated based on the distance of the relative distance of the mobile device from a plurality of wireless access points 19 that are located proximate to the mobile device 12 within the indoor environment. Various techniques can be used to determine the position of the mobile device 12 based on the signals exchanged between the mobile device 12 and the wireless access points 19. For example, the mobile device 12 can be configured to use RTT (Round Trip Time) measurements from the mobile device to "ping" fixed infrastructure, such as a wireless access point or a wireless base station. RTT can represent the amount of time that it takes for a signal sent by the mobile device 12 to travel from the mobile device 12 to a wireless access point or wireless base station and for an acknowledgement sent by the wireless access point or the wireless base station to travel from the wireless access point or the wireless base station to the mobile device 12. The RTT can also include processing time for the wireless access point or the wireless base station to process the signal received from the first mobile device and to generate the acknowledgement. The position of the mobile device might also be estimated using other types of timing measurements. Other types of signal measurements can also be used in addition to or instead of RTT, such as RSSI (received signal strength indication) to help determine a position of the mobile device 12. RSSI of signals received from a wireless access points 19 can be used to estimate the position of the mobile device relative to those wireless access points 19. However, the RSSI can be affected by occlusion of the signals between the mobile device 12 and the wireless access points 19 by structural elements in the indoor environment, objects located in the indoor environment, and even the body of the user of the mobile device 12 depending on how the user is holding the mobile device 12.

An ambiguity in estimating the position of the mobile device may then be identified (stage 515). For example, the positioning engine of the mobile device 12 may use multiple algorithms to determine which LCI the mobile device is currently located. Depending on the position of the mobile device and the algorithms applied by the positioning engine, the positioning engine may arrive at a result that indicates that it is approximately equally probable that the mobile device 12 could be located in a portion of the indoor environment associated with multiple LCI. For example, where a user is located near a door, stairway, elevator, or atrium in a building, the decision-making algorithms may estimate two or more similarly probable location context identifiers (LCI) for current position of the mobile device. Selecting the wrong LCI can result in the failure of the localization procedures relying on the LCI to determine the position of the mobile device. Furthermore, at certain positions, some disambiguation algorithms may work correctly, while others do not, which can result in conflicting determinations of the LCI results. In some positions ambiguity may arise due to insufficient RSSI or RTT measurements.

Information that can be used to resolve the ambiguity in the position of the mobile device can then be identified (stage 520). The positioning engine can then be configured to identify information that the positioning engine could use to determine which of the probable LCIs is likely to be the correct LCI associated with the current position of the mobile device. For example, the positioning engine can identify landmarks in the indoor environment that could be used to determine in which region of the indoor environment the mobile device 12 is located, request which floor the user is located on, or information whether the user is on a stairway, escalator, or elevator between floors. The landmarks can include stores, restaurants, or other businesses that may be in the line of sight of the user of the mobile device. Other landmarks might include points of interest, such as a statue, fountain, garden, playground or other information that might be used to determine which floor the user is on in the indoor environment.

A request for disambiguation information for resolving the ambiguity associated with the position of the mobile device can then be made (stage 525). For example, the positioning engine can be configured to bypass the application requesting the information and to interface directly with the user interface of the mobile device 12 to directly interact with the user through one or more user interface devices of the mobile device 12. The positioning engine can be configured to display a text question on the display of the mobile device requesting information from the user. Examples of such questions are illustrated in FIGS. 9A-9C, 10A-10B, and 11A-11B. The positioning engine can also be configured to prompt the user with audible or haptic cause, such as voice prompts or other audible queries, or vibration alerts.

The positioning engine can be configured to draw the user's attention to the mobile device in an attempt to elicit a response to the query for information that may help to resolve the ambiguity using an audible signal, haptic signal, and/or a visual signal. For example, the positioning engine can be configured to cause the mobile device 12 to emit an audible beep or other sound, such as a voice prompt or a playing a ringtone associated with the mobile device. The positioning engine can also be configured to cause the mobile device 12 to vibrate or provide other haptic feedback to the user. The positioning engine can also be configured to cause a visual indication such as a light on the mobile device 12 to blink, causing the display of the mobile device to flash or to display an indicator.

Disambiguation information for resolving the ambiguity associated with the position of the mobile device than then be received (stage 530). For example, input can then be received from the user responsive to the request for information to help resolve the ambiguity. The positioning engine can be configured to receive the information in various forms. In the examples illustrated in FIGS. 9A-9C, 10A-10B, and 11A-11B, the positioning engine presents the query to the user in the form of a multiple choice messages display on the interface of the user handset. The user can respond by selecting an answer or answers to the question presented to the user using the various input devices available on the mobile device 12, such as a keyboard, a touchscreen, volume controls, microphones, and/or other devices configured to receive input from a user of the mobile device 12.

The positioning engine can also be configured to include a timeout feature that will cause the positioning engine to attempt to resolve the ambiguity without the user input if the user does not respond to the query for information before a timer associated with the timeout feature expires. Including such a timeout feature would allow the positioning engine to continue attempting to determine the position of the mobile device and to not get stuck in a state where the positioning engine is waiting for user input. The user might simply not notice the request for information from the positioning engine or may choose to ignore the request for information.

The positioning engine can also be configured to cancel the request for information if the positioning engine is able to obtain sufficient information to resolve the ambiguity or if the query becomes moot. For example, the user might move away from an obstacle impacting signal quality or may move off of a stairway or escalator between levels of the indoor environment and the ambiguity in the position of the mobile device 12 may become resolvable. In this situation, the positioning engine is not likely to require input from the user any longer as the ambiguity in the position of the mobile device 12 has been resolved.

The ambiguity in estimating the position of the mobile device 12 can then be resolved using the input received from the user (stage 535). User feedback can be used to select the LCI that is most likely to be associated with the position of the mobile device based on the user input. User provided feedback can also be used to by the positioning engine to distinguish the best performing algorithm in certain scenarios. For example, the positioning engine may use multiple algorithms for LCI disambiguation. At certain positions, some disambiguation algorithms may work correctly, while others do not. The positioning engine can be configured to request information from the user to determine whether a particular disambiguation algorithm is working better than others at a particular position and to select disambiguation algorithm that is working better than others when the mobile device is in that position in the future.

The position of the mobile device 12 can then be determined once the ambiguity associated with estimating the position of the mobile device is resolved (stage 540). The positioning engine can use the information to determine the LCI within the indoor environment in which the mobile device 12 is located. The positioning engine can be configured to request assistance data associated with the LCI from a network server or location server, such as server 18, if the assistance data is not already stored on the mobile device 12. The size of the assistance data associated with an LCI can be quite large and would consume a significant portion of the limited memory of the mobile device 12. As a result, the mobile device 12 may need to request the assistance data as required. To conserve both network and mobile device 12 resources, the mobile device 12 may only be configured to request the assistance data from the location server once the mobile device 12 is relatively certain as to which LCI the mobile device is currently in. The assistance data can include various information that the mobile device 12 can use to determine its position. For example, the assistance data can include map information for the indoor environment that can include information that the mobile device 12 can used to determine its position within the indoor environment. For example, the assistance data can identify the position o of one or more wireless access points or wireless base stations. The assistance data can also include information that identifies which wireless access points or wireless base stations are on which floor of the indoor environment. The assistance data may also include additional information about the indoor environment, such as the position of stairs, atrium, hallways, escalator, elevators, and/or other structural elements of the indoor environment. The assistance data may also include the expected RSSI or RTT at various positions.

FIG. 6 is a block flow diagram of another process for determining the position of a mobile device using cached disambiguation information or disambiguation information provided by a user of the mobile device. The method illustrated in FIG. 6 is similar to that illustrated in FIG. 5, but the method of FIG. 6 includes an additional crowdsourcing element.

Disambiguation information can be collected from mobile devices 12 and used by other mobile devices 12 to resolve ambiguities in localizing the mobile devices 12 when in the same indoor environments for which the disambiguation information has been collected. By using this technique, a mobile device 12 can first determine whether other mobile devices 12 have experienced similar ambiguities when attempting to estimate the position of the mobile device in an indoor environment, and the mobile device 12 can use that information to attempt to resolve an ambiguity that arises in the determining the position of the mobile device 12. The disambiguation information can include information that the positioning engine module of the mobile device 12 can use to resolve ambiguities in determining the position of the mobile device 12 in the indoor environment. For example, the disambiguation information can identify which position determination algorithms provide more accurate results for a particular indoor environment or region of an indoor environment. The disambiguation information may also indicate that in the event of ambiguity, which RSSI or RTT measurements can be trusted more, and based on that remove or ignore the less trust-worthy measurements when attempting to resolve the ambiguity.

The process can begin with a positioning engine of the mobile device 12 requesting disambiguation information associated with an indoor environment in which the mobile device is located from the server 18 (stage 600). The mobile device 12 can then receive the requested disambiguation information from the server 18 (stage 605). In some instances, the server 18 may not have any disambiguation information available for the indoor environment. For example, the server 18 can be configured to discard disambiguation information older than a predefined threshold (e.g., one week, one month, six months, or some other increment of time), or there may not have been any mobile devices 12 that have provided disambiguation information for that particular indoor environment. Where the server 18 does not have any disambiguation information to provide to the mobile device 12, the server 18 can transmit a message to the mobile device 12 indicating that no disambiguation is available for the indoor environment.

The mobile device 12 can be configured to cache the disambiguation information received from the server 18 in the data store 450 and to use that information next time the positioning engine module of the mobile device 12 identifies an ambiguity in determining the position of the mobile device 12 for that indoor environment in the future. The mobile device 12 can be configured to remove disambiguation information from the data store 450 if the disambiguation information is older than a predetermined threshold (e.g., one week, one month, six months, or some other predetermined time interval) to ensure that the data in the cache doesn't include disambiguation data that is no longer valid due to changes in the network environment of the indoor environment. Alternatively, a version number can be associated with the disambiguation information, and in the communication with the server, this version number can be compared between the mobile device and the server to check if the server has a newer set of disambiguation information.

The mobile device can then receive a request from an application for the position of the mobile device within an indoor environment (stage 610). The positioning engine of the mobile device 12 can use techniques similar to those described with respect to stage 505 of the method illustrated in FIG. 5 to perform step 610.

The position of the mobile device 12 can then be estimated (stage 615). The positioning engine of the mobile device 12 can use techniques similar to those described with respect to stage 510 of the method illustrated in FIG. 5.

An ambiguity in estimating the position of the mobile device may then be identified (stage 620). The positioning engine of the mobile device 12 can use techniques similar to those described with respect to stage 520 of the method illustrated in FIG. 5.

Information that can be used to resolve the ambiguity in the position of the mobile device can then be identified (stage 620). The positioning engine of the mobile device 12 can use techniques similar to those described with respect to stage 520 of the method illustrated in FIG. 5.

A determination can then be made whether the information that can be used to resolve the ambiguity has already been received (stage 630). For example, the information may have already been received as part of the disambiguation information received from the server in stage 605. Alternative, the user of the mobile device 12 may have already A request for disambiguation information that can be used to help resolve the ambiguity can then be made (stage 635). The positioning engine of the mobile device 12 can use techniques similar to those described with respect to stage 525 of the method illustrated in FIG. 5. For example, the user of the mobile device 12 can be prompted to provide information to help resolve the ambiguity by answering one or more questions presented to the user of the mobile device.

The positioning engine can use the disambiguation information received from the server 18 and/or information received from the user to resolve the ambiguity in determining the position of the mobile device 12 within the indoor environment. If the disambiguation information received from the server 18 and/or the information received from the user of the mobile device fails to resolve the ambiguity, the process can optionally return to stage 635 to query the user for additional information. The positioning engine module of the mobile device can also be configured to prompt the user for additional information using follow up queries to an initial query where the follow up queries are based at least in part on the user's responses to the initial query.

Receive response to request for information from user (stage 640). The positioning engine can be configured to receive the information in various forms. The positioning engine of the mobile device 12 can then receive user response to the query for information in a similar fashion as described in stage 530 of the method illustrated in FIG. 5. For example, input can then be received from the user responsive to the query for information. The mobile device 12 can be configured to prompt for information in the form of textual and/or audio prompts in stage 635. The prompts can be presented as a series of multiple choice questions and/or yes and no questions. The prompts can also be presented as short answer questions. The mobile device 12 can be configured to receive the responses from the user via textual inputs, by key presses or touches on the touch screen to select an answer, and/or via voice input.

The ambiguity in estimating the position of the mobile device 12 can then be resolved using the input received from the user (stage 645). The positioning engine of the mobile device 12 can perform similar steps as those described in stage 525 of the process illustrated in FIG. 5. The positioning engine module of the mobile device 12 can be configured to use disambiguation information received from the server 18 and/or from the user to attempt to resolve the ambiguity in determining the position of the mobile device 12 within the indoor environment.

The position of the mobile device 12 can then be determined by the positioning engine (stage 650). The positioning engine can perform steps similar to those described with respect to stage 540 of the process illustrated in FIG. 5 to determine the position of the mobile device 12.

Disambiguation information can then be provided to the server 18 (stage 655). The positioning engine can be configured to cause the mobile device 12 to send the disambiguation information used by the mobile device 12 to the server 18. The positioning engine can be configured to send the disambiguation information used by the mobile device 12 to the server 18 even if the disambiguation information the disambiguation is the same or similar to that received from the server 18. The server 18 can use this information to update dates and other information associated with the disambiguation information to indicate that the disambiguation information associated with the indoor environment is still current and accurate. The positioning engine of the mobile device 12 can also be configured to send disambiguation information to the server 18 if none was received from the server 18 in stage 605.

The order that the stage of the process can vary. For example, stages 600 and 605 can occur after stage 610 where the request for the position of the mobile device 12 is received and before stage 630 where the determination is made whether the positioning engine module 462 of the mobile device 12 has already received the information that can help to resolve the ambiguity in the position of the mobile device 12.

Figures 7, 8:
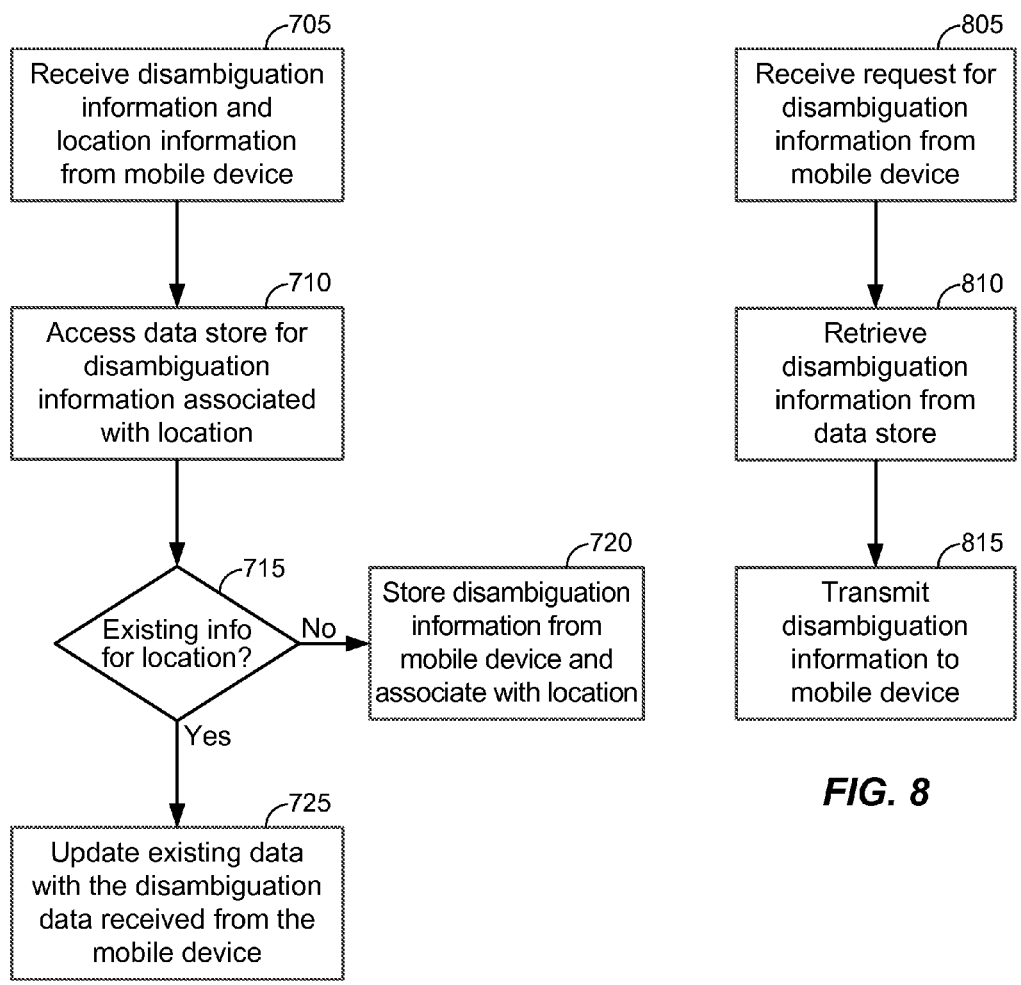
FIG. 7 is a block flow diagram of a process for receiving and storing disambiguation information from mobile device.
FIG. 8 is a block flow diagram of a process for processing a request for disambiguation information from a mobile device.

FIG. 7 is a block flow diagram of a process for receiving and storing disambiguation information from mobile device. The process illustrated in FIG. 7 can be implemented by the server 18 and/or a combination other network resources. The process can begin with receiving disambiguation information from a mobile device 12 that is configured to collect and report disambiguation information to the server 18 (stage 705). The disambiguation information can include information identifying the indoor environment with which the disambiguation information is associated, such as the name of the location, the address of the location, coordinates of the location, identifiers of one or more network elements (e.g., wireless access points and/or wireless base stations) associated with the indoor environment, and/or other identifiers that can be used to identify the indoor environment. The disambiguation information may also identify a region or regions or an LCI or LCIs of the indoor environment for which the disambiguation information is associated. For example, the disambiguation information might be associated with two LCIs in the indoor environment and provide information, such as floor-related information or which localization algorithm or algorithms provide more accurate results, for a particular region of the indoor environment. The disambiguation information can also be associated with the entire indoor environment.

A data store of disambiguation information can then be accessed to determine whether there is existing disambiguation information associated with the indoor environment (stage 710). If there is not existing disambiguation information associated with the indoor environment already stored in the data store, the server 18 can store the disambiguation information in the data store and associate the disambiguation information with the indoor environment (stage 720). If there is already existing disambiguation information stored in the data store, the server 18 can update the existing disambiguation information with the disambiguation information received from the mobile device 12 (stage 725). The server 18 can be configured to resolve conflicts in the disambiguation information received from the mobile devices 12. For example, the server 18 can be configured to eliminate outliers in the disambiguation information received from the mobile devices 12. For example, if a predetermined number or percentage of mobile devices provide disambiguation information that indicates that a particular set of one or more position determination algorithms provide better results in a particular indoor environment, then server 18 can be configured to discard disambiguation information from mobile devices 12 that report that a different set of location determination algorithms provide better results for that indoor environment. Bad disambiguation data may, for example, be created where a user of a mobile device 12 may intentionally or accidentally provide a bad response to a query for disambiguation information from the positioning engine module 462 of the mobile device, which can result in the positioning engine module 462 selecting position determination algorithms that do not provide the best results for the indoor environment and reporting the selection of those algorithms to the server 18. The server 18 can also be configured to timestamp the disambiguation information received from the mobile devices 12 and to discard the disambiguation information if the disambiguation information is older than a predetermined threshold. This approach can allow the server 18 to discard potentially stale data that no longer reflects the network environment associated with an indoor environment. The server 18 can also be configured to organize the disambiguation information received from the mobile devices 12 based on the attributes of the mobile device providing the disambiguation information to the server 18. For example, different types of mobile devices 12 may use different position determining algorithms and/or have other attributes or capabilities that determine, at least in part, which disambiguation information works better for those types of mobile devices. The server 18 can be configured to organize the disambiguation information based on the characteristics of the mobile device providing the data and to provide data from mobile terminals 12 that have similar characteristics to a mobile terminal 12 requesting disambiguation data from the server 18.

FIG. 8 is a block flow diagram of a process for processing a request for disambiguation information from a mobile device. The process illustrated in FIG. 8 can be implemented by the server 18 and/or a combination of other network resources.

The process can begin when the server 18 receives a request for disambiguation information from a mobile device 12 (stage 805). The request can include information identifying an indoor environment in which the mobile device 12 is located. For example, the information identifying the indoor environment might include a name of the location, the address of the location, coordinates of the location, identifiers of one or more network elements (e.g., wireless access points and/or wireless base stations) associated with the indoor environment, and/or other identifiers that can be used to identify the indoor environment.

Disambiguation information associated with the indoor environment can then be retrieved using the information identifying the indoor environment provided with the request (stage 810). The disambiguation information may be stored in a data store that is indexed by location. The server 18 may first use the information identifying the indoor environment lookup an index in the database used to represent the indoor environment. For example, the data store may be indexed by geographic coordinates and the server 18 may have received the name and/or address of the indoor environment and would need to first convert the received information to the geographic coordinates of the indoor environment. The disambiguation information stored in the data store may include disambiguation data received from multiple mobile devices 12 that were configured to collected and report disambiguation data to the server 18.

The disambiguation data associated with the indoor environment (if any) can then be transmitted to the mobile device 12 (stage 810). The server 18 can be configured to send the disambiguation data to the mobile device 12 through one or more intermediary network connections. For example, the server 18 may be configured to transmit the disambiguation data to a wireless access point or wireless base station to which the mobile device 12 is connected, and the wireless access point or wireless base station can then transmit the disambiguation data to the mobile device 12.

Other Considerations

As used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C), or combinations with more than one feature (e.g., AA, AAB, ABBC, etc.).

As used herein, including in the claims, unless otherwise stated, a statement that a function or operation is "based on" an item or condition means that the function or operation is based on the stated item or condition and may be based on one or more items and/or conditions in addition to the stated item or condition.

A wireless communication network does not have all communications transmitted wirelessly, but is configured to have at least some communications transmitted wirelessly.

Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C), or combinations with more than one feature (e.g., AA, AAB, ABBC, etc.).

Further, more than one invention may be disclosed.

Substantial variations to described configurations may be made in accordance with specific requirements. For example, customized hardware might also be used, and/or particular elements might be implemented in hardware, software (including portable software, such as applets, etc.), or both. Further, connection to other computing devices such as network input/output devices may be employed.

Common forms of physical and/or tangible computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, EPROM, a FLASH-EPROM, any other memory chip or cartridge, a carrier wave as described hereinafter, or any other medium from which a computer can read instructions and/or code.

The methods, systems, and devices discussed above are examples. Various configurations may omit, substitute, or add various procedures or components as appropriate. For instance, in alternative configurations, the methods may be performed in an order different from that described, and that various steps may be added, omitted, or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations provides a description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional stages or functions not included in the figure. Furthermore, examples of the methods may be implemented by hardware, software, firmware, middleware, microcode, hardware description languages, or any combination thereof. When implemented in software, firmware, middleware, or microcode, the program code or code segments to perform the tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of operations may be undertaken before, during, or after the above elements are considered. Accordingly, the above description does not bound the scope of the claims.

What is claimed is:

1. A method for determining a position of a mobile device in an indoor environment, the method comprising:
    receiving a request for the position of the mobile device within the indoor environment from an application running on the mobile device;
    estimating the position of the mobile device within the indoor environment based on signals received from a plurality of wireless access points responsive to receiving the request for the position of the mobile device;
    identifying an ambiguity in the position of the mobile device while estimating the position of the mobile device;
    identifying first disambiguation information for resolving the ambiguity in the position of the mobile device;
    requesting the first disambiguation information for resolving the ambiguity associated with the position of the mobile device from a user of the mobile device providing haptic feedback to the user to prompt the user to provide the first disambiguation information, the first disambiguation information being associated with a determining a region in which the mobile device is located;
    receiving the first disambiguation information for resolving the ambiguity associated with the position of the mobile device;
    requesting additional disambiguation information based on the first disambiguation information from the user of the mobile device, the additional disambiguation information being associated with a particular portion of the region in which the mobile device is located;
    resolving the ambiguity in estimating the position of the mobile device using the first disambiguation information and the additional disambiguation information; and
    determining the position of the mobile device in the indoor environment.

2. The method of claim 1, wherein requesting the first disambiguation information for resolving the ambiguity associated with the position of the mobile device comprises displaying a multiple choice question on a display of the mobile device.

3. The method of claim 2, wherein displaying the multiple choice question on the display of the mobile device comprises resizing other running applications being displayed on the display of the mobile device to provide a portion of the display in which the multiple choice question can be displayed on the display of the mobile device.

4. The method of claim 1, wherein the indoor environment includes multiple floors; and wherein the ambiguity in estimating the position of the mobile device is associated with determining which floor of the multiple floors of the indoor environment on which the mobile device is located.

5. The method of claim 1, wherein requesting the first disambiguation information for resolving the ambiguity associated with the position of the mobile device comprises requesting information identifying a floor of the indoor environment on which the mobile device is located.

6. The method of claim 1, wherein requesting the first disambiguation information for resolving the ambiguity associated with the position of the mobile device comprises requesting information identifying visible landmarks in the indoor environment located proximate to the mobile device.

7. The method of claim 1, wherein resolving the ambiguity in estimating the position of the mobile device using the first disambiguation information and the additional disambiguation information comprises selecting a position determination algorithm based at least in part on the first disambiguation information and the additional disambiguation information.

8. The method of claim 1, wherein determining the position of the mobile device in the indoor environment comprises downloading a map of wireless access points from a server, the map of wireless access points being associated with a floor of the indoor environment on which the mobile device is estimated to be located.

9. The method of claim 1, wherein the first disambiguation information is received from the user of the mobile device, the method further comprising:
transmitting at least a portion of the first disambiguation information received from the user of the mobile device to a remote server.

10. The method of claim 1, wherein the additional disambiguation information can be used to further refine the position of the mobile device within the indoor environment.

11. An apparatus for determining a position of a mobile device in an indoor environment, the apparatus comprising:
means for receiving a request for the position of the mobile device within the indoor environment from an application running on the mobile device;
means for estimating the position of the mobile device within the indoor environment based on signals received from a plurality of wireless access points responsive to receiving the request for the position of the mobile device;
means for identifying an ambiguity in the position of the mobile device while estimating the position of the mobile device;
means for identifying first disambiguation information that can be used to resolve the ambiguity in the position of the mobile device;
means for requesting the first disambiguation information for resolving the ambiguity associated with the position of the mobile device from a user of the mobile device by providing haptic feedback to the user to prompt the user to provide the first disambiguation information, the first disambiguation information being associated with a determining a region in which the mobile device is located;
means for receiving the first disambiguation information for resolving the ambiguity associated with the position of the mobile device;
means for requesting additional disambiguation information based on the first disambiguation information from the user of the mobile device, the additional disambiguation information being associated with a particular region in which the mobile device is located;
means for resolving the ambiguity in estimating the position of the mobile device using the first disambiguation information and the additional disambiguation information; and
means for determining the position of the mobile device in the indoor environment.

12. The apparatus of claim 11, wherein the means for requesting the first disambiguation information for resolving the ambiguity associated with the position of the mobile device comprises means for displaying a multiple choice question on a display of the mobile device.

13. The apparatus of claim 12, wherein the means for displaying the multiple choice question on the display of the mobile device comprise means for resizing other running applications being displayed on the display to provide a portion of the display in which the multiple choice question can be displayed on the display of the mobile device.

14. The apparatus of claim 11, wherein the indoor environment includes multiple floors; and wherein the ambiguity in estimating the position of the mobile device is associated with determining which floor of the multiple floors of the indoor environment on which the mobile device is located.

15. The apparatus of claim 11, wherein the means for requesting the first disambiguation information for resolving the ambiguity associated with the position of the mobile device comprises means for requesting information identifying a floor of the indoor environment on which the mobile device is located.

16. The apparatus of claim 11, wherein the means for requesting the first disambiguation information for resolving the ambiguity associated with the position of the mobile device comprises means for requesting information identifying visible landmarks in the indoor environment located proximate to the mobile device.

17. The apparatus of claim 11, wherein the means for resolving the ambiguity in estimating the position of the mobile device using the first disambiguation information and the additional disambiguation information comprises means for selecting a position determination algorithm based at least in part on the first disambiguation information and the additional disambiguation information.

18. The apparatus of claim 11, wherein the means for determining the position of the mobile device in the indoor environment comprises means for downloading a map of wireless access points from a server, the map of wireless access points being associated with a floor of the indoor environment on which the mobile device is estimated to be located.

19. The apparatus of claim 11, wherein the first disambiguation information is received from the user of the mobile device, the apparatus further comprising:
means for transmitting at least a portion of the first disambiguation information received from the user of the mobile device to a remote server.

20. A non-transitory computer-readable medium, having stored thereon computer-readable instructions for determining a position of a mobile device in an indoor environment, comprising instructions configured to cause a computer to:
receive a request for the position of the mobile device within the indoor environment from an application running on the mobile device;
estimate the position of the mobile device within the indoor environment based on signals received from a plurality of wireless access points responsive to receiving the request for the position of the mobile device;
identify an ambiguity in the position of the mobile device while estimating the position of the mobile device;
identify first disambiguation information for resolving the ambiguity in the position of the mobile device;
request the first disambiguation information for resolving the ambiguity associated with the position of the mobile device from a user of the mobile device providing haptic feedback to the user to prompt the user to provide the first disambiguation information, the first disambiguation information being associated with a determining a region in which the mobile device is located;
receive the first disambiguation information for resolving the ambiguity associated with the position of the mobile device;
request additional disambiguation information based on the first disambiguation information from the user of the mobile device, the additional disambiguation information being associated with a particular portion of the region in which the mobile device is located;

resolve the ambiguity in estimating the position of the mobile device using the first disambiguation information and the additional disambiguation information; and determine the position of the mobile device in the indoor environment.

21. The non-transitory computer-readable medium of claim 20, wherein the instructions configured to cause the computer to request the first disambiguation information for resolving the ambiguity associated with the position of the mobile device comprise instructions configured to cause the computer to display a multiple choice question on a display of the mobile device.

22. The non-transitory computer-readable medium of claim 21, wherein the instructions configured to cause the computer to display the multiple choice question on the display of the mobile device comprise instructions configured to cause the computer to resize other running applications being displayed on the display to provide a portion of the display in which the multiple choice question can be displayed on the display of the mobile device.

23. The non-transitory computer-readable medium of claim 20, wherein the indoor environment includes multiple floors; and wherein the ambiguity in estimating the position of the mobile device is associated with determining which floor of the multiple floors of the indoor environment on which the mobile device is located.

24. The non-transitory computer-readable medium of claim 20, wherein the instructions configured to cause the computer to request the first disambiguation information for resolving the ambiguity associated with the position of the mobile device comprise instructions configured to cause the computer to request information identifying a floor of the indoor environment on which the mobile device is located.

25. The non-transitory computer-readable medium of claim 20, wherein the instructions configured to cause the computer to request the first disambiguation information for resolving the ambiguity associated with the position of the mobile device comprise instructions configured to cause the computer to request from a user information identifying visible landmarks in the indoor environment located proximate to the mobile device.

26. The non-transitory computer-readable medium of claim 20, wherein the instructions configured to cause the computer to resolve the ambiguity in estimating the position of the mobile device using the first disambiguation information and the additional disambiguation information comprise instructions configured to cause the computer to select a position determination algorithm based at least in part on the first disambiguation information and the additional disambiguation information.

27. The non-transitory computer-readable medium of claim 20, wherein the instructions configured to cause the computer to determine the position of the mobile device in the indoor environment comprise instructions configured to cause the computer to download a map of wireless access points from a server, the map of wireless access points being associated with a floor of the indoor environment on which the mobile device is estimated to be located.

28. The non-transitory computer-readable medium of claim 20, wherein the first disambiguation information is received from the user of the mobile device, the non-transitory computer-readable medium further comprising instructions configured to cause the computer to:
transmit at least a portion of the first disambiguation information received from the user to a remote server.

29. An apparatus for determining a position of a mobile device in an indoor environment, the apparatus comprising:
a transceiver configured to transmit and receive data wirelessly;
a memory configured to store processor-executable program code;
a processor configured to:
receive a request for the position of the mobile device within the indoor environment from an application running on the mobile device;
estimate the position of the mobile device within the indoor environment based on signals received from a plurality of wireless access points responsive to receiving the request for the position of the mobile device;
identify an ambiguity in the position of the mobile device while estimating the position of the mobile device;
identify first disambiguation information for resolving the ambiguity in the position of the mobile device;
request the first disambiguation information for resolving the ambiguity associated with the position of the mobile device from a user of the mobile device providing haptic feedback to the user to prompt the user to provide the first disambiguation information, the first disambiguation information being associated with a determining a region in which the mobile device is located;
receive the first disambiguation information for resolving the ambiguity associated with the position of the mobile device;
request additional disambiguation information based on the first disambiguation information from the user of the mobile device, the additional disambiguation information being associated with a particular portion of the region in which the mobile device is located;
resolve the ambiguity in estimating the position of the mobile device using the first disambiguation information and the additional disambiguation information; and
determine the position of the mobile device in the indoor environment.

30. The apparatus of claim 29, wherein the processor being configured to request the first disambiguation information for resolving the ambiguity associated with the position of the mobile device is further configured to display a multiple choice question on a display of the mobile device.

31. The apparatus of claim 30, wherein the processor being configured to display the multiple choice question on the display of the mobile device is further configured to resize other running applications being displayed on the display of the mobile device to provide a portion of the display in which the multiple choice question can be displayed on the display of the mobile device.

32. The apparatus of claim 29, wherein the indoor environment includes multiple floors; and wherein the ambiguity in estimating the position of the mobile device is associated with determining which floor of the multiple floors of the indoor environment on which the mobile device is located.

33. The apparatus of claim 29, wherein the processor being configured to request the first disambiguation information for resolving the ambiguity associated with the position of the mobile device is further configured to request information identifying a floor of the indoor environment on which the mobile device is located.

34. The apparatus of claim 29, wherein the processor being configured to request the first disambiguation information for resolving the ambiguity associated with the position of the mobile device is further configured to request information identifying visible landmarks in the indoor environment located proximate to the mobile device.

35. The apparatus of claim 29, wherein the processor being configured to resolve the ambiguity in estimating the position of the mobile device using the first disambiguation information and the additional disambiguation information is further configured to select a position determination algorithm based at least in part on input received from the user.

36. The apparatus of claim 29, wherein the processor being configured to determine the position of the mobile device in the indoor environment is further configured to download a map of wireless access points from a server, the map of wireless access points being associated with a floor of the indoor environment on which the mobile device is estimated to be located.

37. The apparatus of claim 29, wherein the first disambiguation information is received from the user of the mobile device, and wherein the processor is further configured to:
  transmit at least a portion of the first disambiguation information received from the user to a remote server.

38. A method for determining a position of a mobile device in an indoor environment, the method comprising:
  sending a request from the mobile device for first disambiguation information for the indoor environment;
  receiving a response from a server providing the first disambiguation information for the indoor environment;
  receiving a request for the position of the mobile device within the indoor environment from an application running on the mobile device;
  estimating the position of the mobile device within the indoor environment based on signals received from a plurality of wireless access points responsive to receiving the request for the position of the mobile device;
  identifying an ambiguity in the position of the mobile device while estimating the position of the mobile device in which the mobile device is determined to be located at one of a plurality of probable positions within different regions of the indoor environment;
  identifying second disambiguation information for resolving the ambiguity in the position of the mobile device;
  determining whether the second disambiguation information for resolving the ambiguity is included in the first disambiguation information received from the server;
  requesting the second disambiguation information for resolving the ambiguity from a user of the mobile device, by providing haptic feedback to the user to prompt the user to provide the second disambiguation information, responsive to determining that the second disambiguation information is not included in the first disambiguation information received from the server;
  resolving the ambiguity in estimating the position of the mobile device using the first disambiguation information and the second disambiguation information; and
  determining the position of the mobile device within the indoor environment.

39. The method of claim 38, wherein requesting the second disambiguation information for resolving the ambiguity from the user of the mobile device further comprises:
  receiving the second disambiguation information from the user responsive to requesting the second disambiguation information from the user.

40. The method of claim 39, wherein requesting the second disambiguation information from the user of the mobile device for the second disambiguation information further comprises displaying a multiple choice question on a display of the mobile device.

41. The method of claim 39, further comprising:
  sending the second disambiguation information received from the user of the mobile device to the server.

42. An apparatus for determining a position of a mobile device in an indoor environment, the apparatus comprising:
  means for sending a request from the mobile device for first disambiguation information for the indoor environment;
  means for receiving a response from a server providing the first disambiguation information for the indoor environment;
  means for receiving a request for the position of the mobile device within the indoor environment from an application running on the mobile device;
  means for estimating the position of the mobile device within the indoor environment based on signals received from a plurality of wireless access points responsive to receiving the request for the position of the mobile device;
  means for identifying an ambiguity in the position of the mobile device while estimating the position of the mobile device in which the mobile device is determined to be located at one of a plurality of probable positions within different regions of the indoor environment;
  means for identifying second disambiguation information for resolving the ambiguity in the position of the mobile device;
  means for determining whether the second disambiguation information for resolving the ambiguity is included in the first disambiguation information received from the server;
  means for requesting the second disambiguation information for resolving the ambiguity from a user of the mobile device, by providing haptic feedback to the user to prompt the user to provide the second disambiguation information, responsive to determining that the second disambiguation information is not included in the first disambiguation information received from the server;
  means for resolving the ambiguity in estimating the position of the mobile device using the first disambiguation information and the second disambiguation information; and
  means for determining the position of the mobile device within the indoor environment.

43. The apparatus of claim 42, wherein the means for requesting the second disambiguation information for resolving the ambiguity from the user of the mobile device further comprises:
  means for receiving the second disambiguation information from the user responsive to requesting the second disambiguation information from the user; and
  means for resolving the ambiguity in estimating the position of the mobile device using the second disambiguation information received from the user.

44. The apparatus of claim 43, wherein the means for requesting the second disambiguation information from the user of the mobile device for the second disambiguation information comprises means for displaying a multiple choice question on a display of the mobile device.

45. The apparatus of claim 43, further comprising:
  means for sending the second disambiguation information received from the user of the mobile device to the server.

46. A non-transitory computer-readable medium, having stored thereon computer-readable instructions for determining a position of a mobile device in an indoor environment, comprising instructions configured to cause a computer to:
  send a request from the mobile device for first disambiguation information for the indoor environment;

receive a response from a server providing the first disambiguation information for the indoor environment;

receive a request for the position of the mobile device within the indoor environment from an application running on the mobile device;

estimate the position of the mobile device within the indoor environment based on signals received from a plurality of wireless access points responsive to receiving the request for the position of the mobile device;

identify an ambiguity in the position of the mobile device while estimating the position of the mobile device in which the mobile device is determined to be located at one of a plurality of probable positions within different regions of the indoor environment;

identify second disambiguation information for resolving the ambiguity in the position of the mobile device;

determine whether the second disambiguation information for resolving the ambiguity is included in the first disambiguation information received from the server;

request the second disambiguation information for resolving the ambiguity from a user of the mobile device, by providing haptic feedback to the user to prompt the user to provide the second disambiguation information, responsive to determining that the second disambiguation information is not included in the first disambiguation information received from the server;

resolve the ambiguity in estimating the position of the mobile device using the first disambiguation information and the second disambiguation information; and determine the position of the mobile device within the indoor environment.

47. The non-transitory computer-readable medium of claim 46, wherein the instructions to cause the computer to request the second disambiguation information for resolving the ambiguity from the user of the mobile device further comprise instructions to cause the computer to:

prompt for the second disambiguation information from the user of the mobile device; and receive the second disambiguation information from the user responsive to requesting the second disambiguation information from the user.

48. The non-transitory computer-readable medium of claim 47, wherein the instructions to cause the computer to request the second disambiguation information from the user of the mobile device comprise instructions to cause the computer to display a multiple choice question on a display of the mobile device.

49. The non-transitory computer-readable medium of claim 47, further comprising instructions to cause the computer to:

send the second disambiguation information received from the user of the mobile device to the server.

50. An apparatus for determining a position of a mobile device in an indoor environment, the apparatus comprising:

a transceiver configured to transmit and receive data wirelessly;

a memory configured to store processor-executable program code;

a processor configured to:

send a request from the mobile device for first disambiguation information for the indoor environment;

receive a response from a server providing the first disambiguation information for the indoor environment;

receive a request for the position of the mobile device within the indoor environment from an application running on the mobile device;

estimate the position of the mobile device within the indoor environment based on signals received from a plurality of wireless access points responsive to receiving the request for the position of the mobile device;

identify an ambiguity in the position of the mobile device while estimating the position of the mobile device in which the mobile device is determined to be located at one of a plurality of probable positions within different regions of the indoor environment;

identify second disambiguation information for resolving the ambiguity in the position of the mobile device;

determine whether the second disambiguation information for resolving the ambiguity is included in the first disambiguation information received from the server;

request the second disambiguation information for resolving the ambiguity from a user of the mobile device, by providing haptic feedback to the user to prompt the user to provide the second disambiguation information, responsive to determining that the second disambiguation information is not included in the first disambiguation information received from the server; and resolve the ambiguity in estimating the position of the mobile device using the first disambiguation information and the second disambiguation information; and determine the position of the mobile device within the indoor environment.

51. The apparatus of claim 50, wherein the processor being configured to request the second disambiguation information for resolving the ambiguity from the user of the mobile device is further configured to:

receive the second disambiguation information from the user responsive to requesting the second disambiguation information from the user.

52. The apparatus of claim 51, wherein the processor being configured to request from the user of the mobile device the second disambiguation information is further configured to display a multiple choice question on a display of the mobile device.

53. The apparatus of claim 51, wherein the processor is further configured to:

send the second disambiguation information received from the user of the mobile device to the server.

* * * * *